US009175755B2

(12) United States Patent
Clopet et al.

(10) Patent No.: US 9,175,755 B2
(45) Date of Patent: Nov. 3, 2015

(54) MECHANISM FOR TRANSMITTING POWER OF ROTATION

(76) Inventors: Cyril Clopet, Pouilley-les-Vignes (FR);
Pierre Alain Azzopardi, Besancon (FR);
Vincent Revol, Pouilley-les-Vignes (FR)

( * ) Notice: Subject to any disclaimer, the term of this patent is extended or adjusted under 35 U.S.C. 154(b) by 150 days.

(21) Appl. No.: 14/234,088

(22) PCT Filed: Jul. 20, 2012

(86) PCT No.: PCT/FR2012/051729
§ 371 (c)(1),
(2), (4) Date: Jan. 21, 2014

(87) PCT Pub. No.: WO2013/014378
PCT Pub. Date: Jan. 31, 2013

(65) Prior Publication Data
US 2014/0162816 A1    Jun. 12, 2014

(30) Foreign Application Priority Data
Jul. 22, 2011    (FR) ..................................... 11 56699

(51) Int. Cl.
*F16H 55/00*    (2006.01)
*F16H 9/02*    (2006.01)
(Continued)

(52) U.S. Cl.
CPC .. *F16H 9/10* (2013.01); *F16H 9/24* (2013.01); *F16H 55/54* (2013.01)

(58) Field of Classification Search
CPC ............. F16H 55/54; F16H 9/10; F16H 9/24; F16H 9/08; B62M 9/08
USPC ..................................................... 474/47, 49
See application file for complete search history.

(56) References Cited

U.S. PATENT DOCUMENTS 2,328,544 A  *  9/1943  Booth ............................. 474/31
2,344,341 A  *  3/1944  Coen ............................... 474/53
(Continued)

FOREIGN PATENT DOCUMENTS

DE    2006931    9/1971
EP    1811205    7/2007
(Continued)

OTHER PUBLICATIONS

European Patent Office, International Search Report issued in corresponding PCT Application No. PCT/FR2012/051729, dated Sep. 19, 2012.
(Continued)

*Primary Examiner* — Henry Liu
(74) *Attorney, Agent, or Firm* — Patzik, Frank & Samotny Ltd.

(57) ABSTRACT

A mechanism for transmitting rotational power comprising: a link extending along a closed loop and continued by a succession of portions each having a longitudinal direction tangent to the closed loop; and temporary unification means comprising a plurality of self-locking means distributed at least along an active portion of a first drive circle, and comprising at least one rigid locking element simultaneously pressing against a first support surface of the first rotating element and a second support surface of a link portion facing the locking element. The first and second support surfaces are arranged so that one locking element of the first drive circle active portion is jammed between the support surfaces and is capable of self-unlocking when the corresponding self-locking means leaves the active portion. One of the support surfaces is a tangential gripping surface that is parallel to the longitudinal direction of the link portion against which the locking element presses.

21 Claims, 23 Drawing Sheets

(51) Int. Cl.
*F16H 59/00* (2006.01)
*F16H 61/00* (2006.01)
*F16H 63/00* (2006.01)
*F16H 9/10* (2006.01)
*F16H 9/24* (2006.01)
*F16H 55/54* (2006.01)

(56) References Cited

U.S. PATENT DOCUMENTS

| | | | | |
|---|---|---|---|---|
| 2,466,365 | A * | 4/1949 | Booth | 474/8 |
| 2,744,414 | A * | 5/1956 | Alexeev | 74/216.3 |
| 3,916,705 | A * | 11/1975 | Smith et al. | 474/31 |
| 4,078,442 | A * | 3/1978 | Bendall | 474/37 |
| 4,810,236 | A * | 3/1989 | Kumm | 474/101 |
| 4,816,008 | A * | 3/1989 | Leonard | 474/47 |
| 4,832,660 | A * | 5/1989 | Leonard | 474/49 |
| 4,854,921 | A * | 8/1989 | Kumm | 474/49 |
| 4,973,289 | A * | 11/1990 | Leonard | 474/49 |
| 5,104,357 | A * | 4/1992 | Leonard et al. | 474/49 |
| 5,226,854 | A * | 7/1993 | Hauser | 474/83 |
| 5,443,423 | A * | 8/1995 | Ha | 474/47 |
| 5,476,422 | A * | 12/1995 | Schendel | 474/49 |
| 5,492,506 | A * | 2/1996 | Lorance | 474/49 |
| 5,688,199 | A * | 11/1997 | Spirig | 474/49 |
| 6,152,844 | A * | 11/2000 | Daugherty | 474/49 |
| 6,183,385 | B1 * | 2/2001 | Bakulich, Jr. | 474/49 |
| 6,267,699 | B1 * | 7/2001 | Gruich et al. | 474/49 |
| 6,332,852 | B1 * | 12/2001 | Allard | 474/53 |
| 6,398,679 | B1 * | 6/2002 | Brown | 474/35 |
| 6,458,054 | B1 * | 10/2002 | Mimura | 474/100 |
| 7,077,771 | B2 * | 7/2006 | Jeng | 474/49 |
| 7,211,014 | B2 * | 5/2007 | Naude | 474/49 |
| 7,261,655 | B2 * | 8/2007 | Vargas | 474/49 |
| 7,713,153 | B2 * | 5/2010 | Naude | 474/49 |
| 7,951,027 | B2 * | 5/2011 | An | 474/47 |
| 8,202,187 | B2 * | 6/2012 | Man | 475/221 |
| 2002/0042314 | A1 * | 4/2002 | Mimura | 474/56 |
| 2004/0198542 | A1 * | 10/2004 | Fuerle | 474/162 |
| 2005/0148416 | A1 * | 7/2005 | Naude | 474/49 |
| 2005/0288137 | A1 * | 12/2005 | Vargas | 474/47 |
| 2007/0087875 | A1 * | 4/2007 | Weaver | 474/51 |
| 2007/0243969 | A1 * | 10/2007 | Siman-Tov | 476/5 |

FOREIGN PATENT DOCUMENTS

| | | |
|---|---|---|
| FR | 2848633 | 6/2004 |
| GB | 356196 | 9/1931 |
| GB | 436053 | 10/1935 |
| GB | 478723 | 4/1936 |
| GB | 551690 | 3/1943 |
| GB | 575725 | 3/1946 |
| GB | 840772 | 7/1960 |
| GB | 1380487 | 1/1975 |
| JP | H04194440 | 7/1992 |
| WO | 2008012591 | 1/2008 |

OTHER PUBLICATIONS

International Bureau of WIPO, English Translation of Written Opinion of the International Searching Authority issued in corresponding PCT Application No. PCT/FR2012/051729, dated Jan. 28, 2014.
English translation of Abstract for German Publication No. DE2006931.
English translation of Abstract for French Publication No. 2848633.
English translation of Abstract for Japanese Publication No. JPH04194440.

* cited by examiner

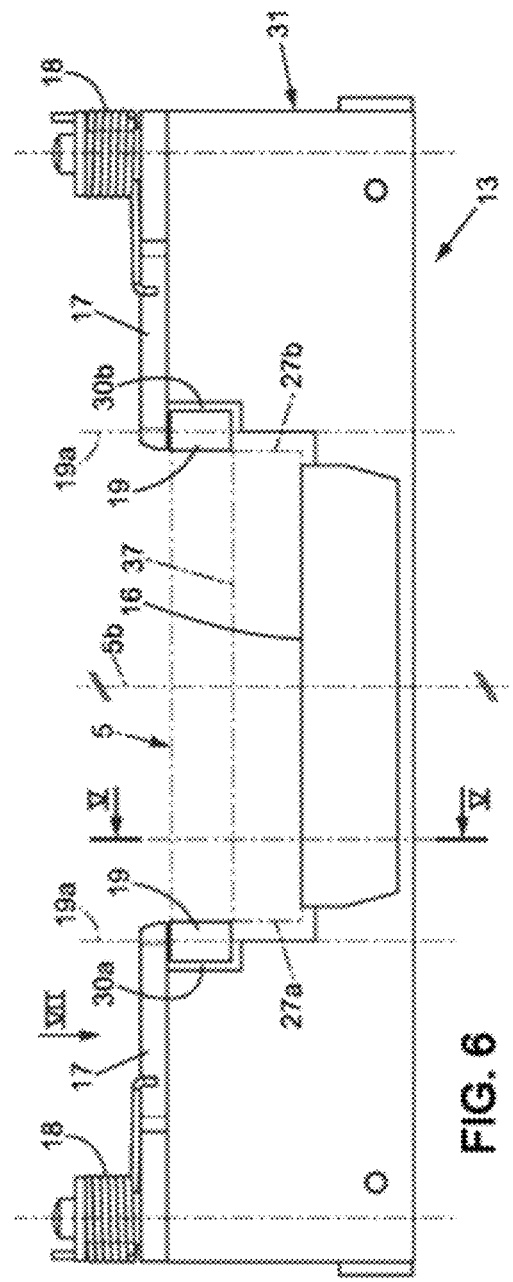
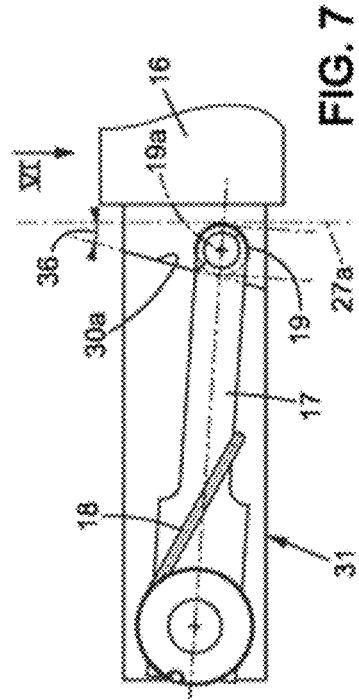
FIG. 6
FIG. 7

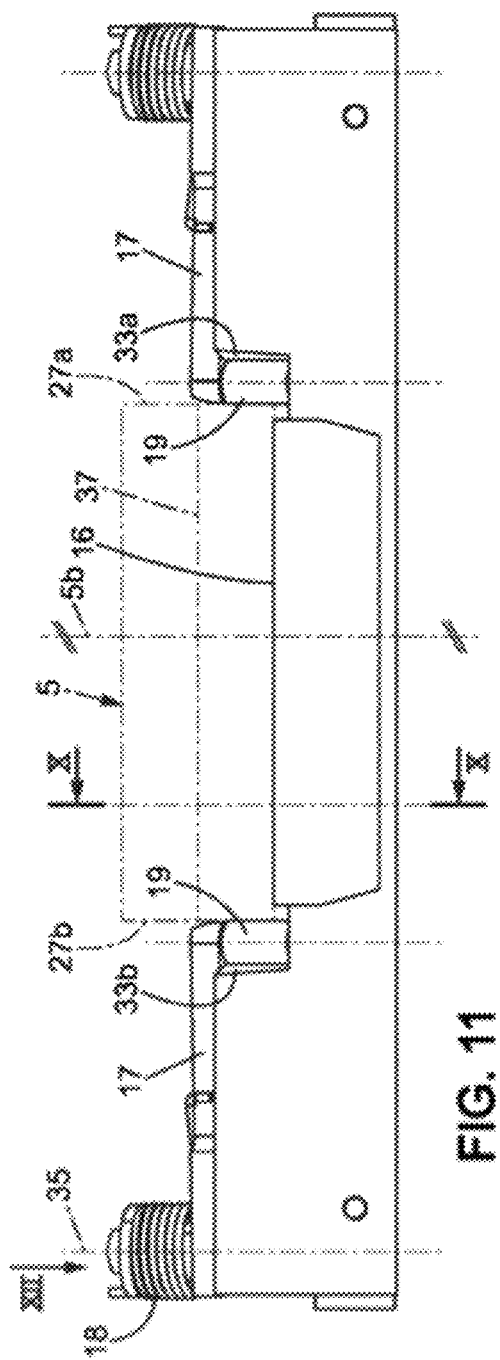
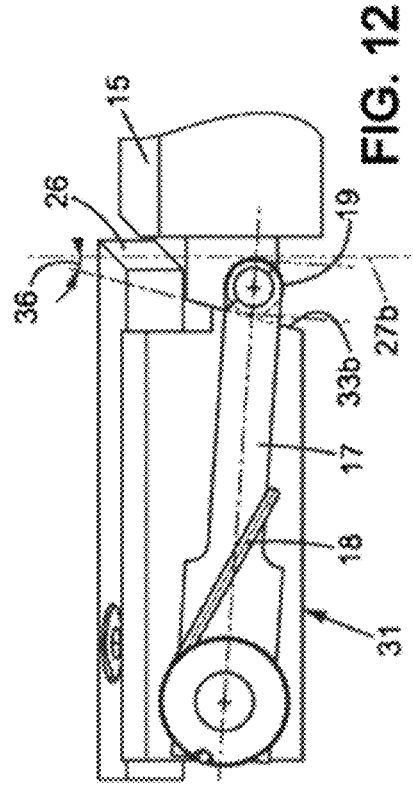
FIG. 11
FIG. 12

FIG. 13a
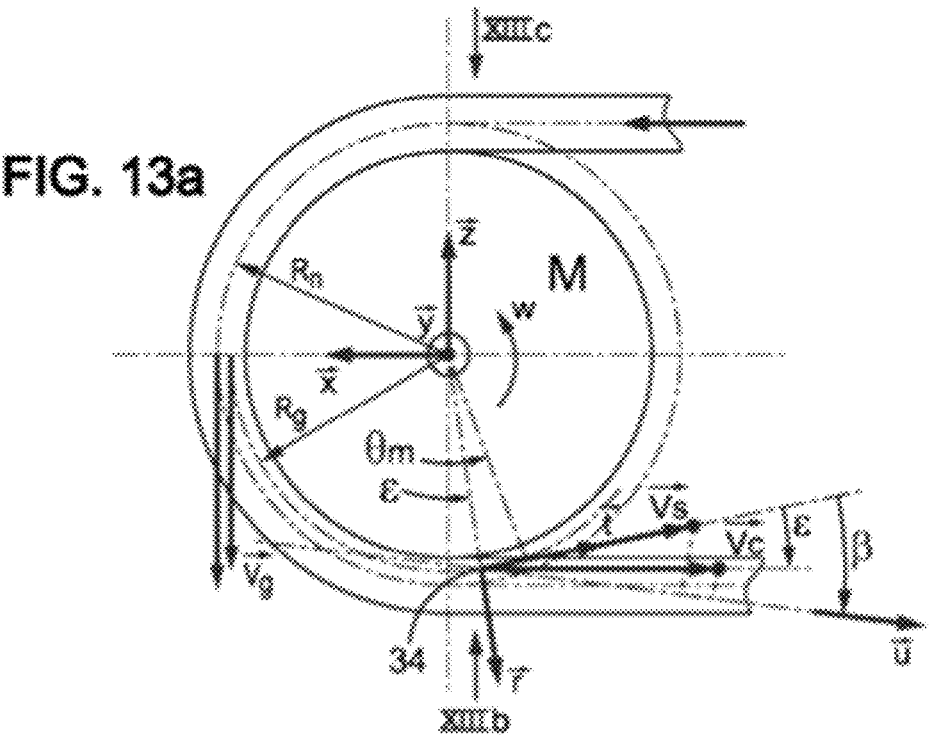
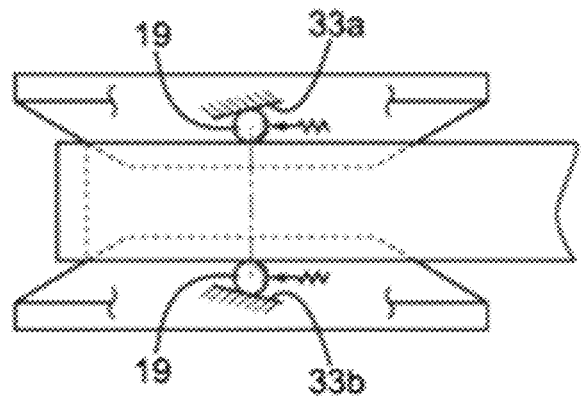
FIG. 13b
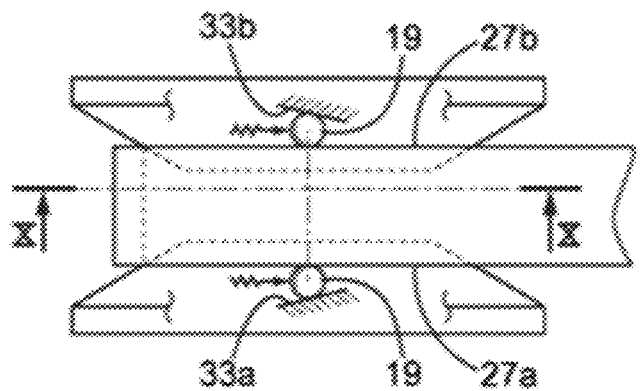
FIG. 13c

MECHANISM FOR TRANSMITTING POWER OF ROTATION

FIELD OF THE INVENTION

The invention concerns the field of mechanisms for transmitting mechanical power between two rotating elements. The invention notably concerns mechanisms able to continuously vary the ratio of rotational speed. Such transmission systems are known as "continuously variable transmissions" (CVT).

STATE OF THE ART

In 1935, application GB 436,053 described a speed changing mechanism that used a chain connecting two shafts. On each shaft is mounted a wheel equipped with sectors, each of which is mounted on a spring so that they press against the chain. When the chain links have gone around the wheel and are about to connect to the other wheel, the release of the links requires that the pressure be released by successively compressing the sector springs. In this mechanism, the circular trajectory of the chain is maintained solely by the pressure against the sides of the chain. Thus, the pressure force must be very high to prevent the chain from slipping on the wheel. This limits the torque that can be transmitted. Moreover, the energy consumed in compressing the springs and releasing the pressure greatly reduces the energy efficiency of the transmission.

Application GB 356,196 also describes a variable-speed power transmission mechanism.

Application U.S. Pat. No. 4,078,442, published in 1978, illustrates a variable speed control. A chain is equipped, at each end of its articulation pins, with traction pads that rest on conical surfaces of two facing wheels. When the chain is stretched between two assemblies of two facing conical wheels, the pressure of the pads on the conical surfaces enables a torque to be transmitted. However, there is a drawback to such transmission in that adhesion of the chain to the conical surfaces requires that the chain be stretched, not only in its "stretched" strand but also in its "slack" strand. The chain must be subject to a basic tension that is not used to transmit torque and brings about multiple parasitic sources of friction. For example, whenever a link moves from a straight portion of its trajectory to a wound portion, the energy dissipated through friction on the axis of the link itself is increased because of this basic tension. The energy efficiency is very mediocre.

In 2008, application WO 2008/012591 proposed a transmission that used a chain of fixed length but comprising drive elements mounted on an elastic support and engaging with radial grooves. In this way the spacing between two successive drive elements could be modified. This transmission also had mediocre efficiency because the compression and release of the elastic supports of each link consumes energy.

Moreover, U.S. Pat. No. 2,328,544, GB 575,725, GB 551,690, and EP 1,811,205 also describe continuously variable transmissions.

OBJECT AND SUMMARY OF THE INVENTION

The invention proposes a mechanism and method of transmitting rotational power that remedies at least one of the aforementioned problems.

A goal of the invention is to propose a rotational power transmission that has an improved energy efficiency and is compatible with a continuously variable transmission ratio.

An embodiment of a first aspect of the invention is a mechanism for transmitting rotational comprising:
- a link extending along a closed loop and consisting of a succession of portions each of which has a longitudinal direction tangent to the closed loop;
- first and second rotary elements, respectively mobile in rotation around a first and second axis;
- link guide means designed to guide the link along a first drive circle coaxial to the first axis and along a second drive circle coaxial to the second axis, the closed loop comprising an active portion of each of the drive circles; and
- means for temporarily unifying each link portion with successively each of the rotating elements whenever the link portion passes into the corresponding active portion.

Temporary unifying means comprise a plurality of self-locking means distributed at least along the active portion of the first drive circle, self-locking means comprising at least one rigid locking element resting simultaneously, on the one hand, against a first support surface belonging to the first rotating element and, on the other hand, against a second support surface belonging to a link portion facing the locking element.

First and second support surfaces are arranged in such a way that at least one locking element of the active portion of the first drive circle is jammed between the first and second support surface and is capable of self-unlocking whenever the corresponding self-locking means leaves the active portion.

At least one of the first or second support surfaces is a tangential gripping surface that is parallel to the longitudinal direction of the link portion against which the locking element is resting.

A "rigidlocking element" is understood to mean either a rigid body or a subassembly of several rigid bodies capable of being movable with respect to one another in a certain configuration, but where the subassembly has a configuration in which those bodies are in static equilibrium with one another and form a rigid subassembly capable of being locked.

The fact that one of the support surfaces is parallel to the longitudinal direction of the link portion means that the mechanical power transmission utilizes the friction component of the support upon this surface. There is no obstacle drive as in bicycle gears. This allows the tangential gripping to occur over an infinite number of possible positions, for example, throughout the entire length of the link and not only in certain discrete locations. This enables the locking element to unify the link portion and the corresponding rotational element regardless of the diameter of the drive circle. Moreover, the fact that this unification takes place by jamming a locking element means that the support force on the first and second support surfaces is proportional to the torque transmitted in such a way as to maintain the immobilization. Additionally, the locking element constitutes a mechanical intermediary between the rotary element and the link. The unification by jamming assumes certain frictional and relative speed conditions. When those conditions disappear, self-unlocking occurs. No energy needs to be supplied for the link to leave the rotary element. Thus, the combination of unification by jamming and support on a surface parallel to the link portion provides a continuously variable transmission ratio, the transmission of high torque values, and good energy efficiency.

We distinguish the relative immobilization of two parts by the jamming of a locking element from the simple immobilization of said two parts through the interposition of an intermediary element between the parts, such as a key or a bolt, by the fact that the persistence of the cause of relative movement between the two parts bound by jamming brings about deformations that increase the locking. The locking element can be jammed by friction between the two parts being unified, as in the case of a free-wheel mechanism, or with friction between the locking element and one of the two parts only.

In the case of the jamming of a locking element between the aforementioned first and second support surfaces, we can characterize the jamming by considering the centers of the contact surfaces of the locking element with respectively the first and second support surface. We refer to a line of action as the line passing between these two centers. The jamming is thus characterized by the fact that the line of action has an angle at least with respect to the normal to the support surface that is the tangential gripping surface, which normal is taken at the location of the corresponding center, and by the fact that the tangent of said angle is less than the coefficient of static friction of the locking element with the tangential gripping surface.

In prior art U.S. Pat. No. 4,078,442, mentioned above, the traction pads are simply compressed between the conical wheel and the rest of the chain. The transmitted torque is the cause of the potential relative motion between the wheel and the rest of the chain. The axial compressive force of the pads is not increased by the persistence of the transmitted torque. There is no jamming of the traction pad between the conical wheel and the chain. Similarly, in prior art GB 436,053, the pinching force of the chain exercised by the sectors is independent of the transmitted torque. There is no jamming of those sectors. In prior art WO2008/012591, the gearing elements are simply in direct contact with the radial grooves; they are not jammed against those grooves.

Advantageously, the mechanism is related to a continuously variable transmission, wherein the guide means of the link are designed so that the diameter of at least the first drive circle can be varied.

According to an embodiment, the locking elements are capable of rolling on the first and/or second corresponding support surface. Because of the ability of this mechanical intermediary to roll around at least on one of those support surfaces, it is possible to move those two support surfaces with respect to one another with reduced force while the locking element is still jammed between them and while the support force is high. There is no static frictional force to be overcome, only a very reduced rolling friction. This enables the locking conditions to be discontinued without a significant energy input. The fact of using a means for unifying the movement of the link with at least one of the rotary elements by jamming an element capable of rolling has the surprising effect, on the one hand, of allowing a very high unification force to be used, opening the way to high-power transmission, and, on the other hand, of facilitating the separation between the link and the rotary element. This greatly improves the energy efficiency of the transmission.

Advantageously, the locking elements of the mechanism are taken from among a group comprising: balls, rollers, barrels, subassemblies equipped with a support pad rubbing against the tangential gripping surface and comprising an element of reduced coefficient of friction against the other support surface (rolling elements, sliding elements, oil film, etc.); cams (46) articulated at one extremity and having a curved and rubbing support surface at the other extremity, elongated cams (45) having two curved and rubbing support extremities.

Advantageously, the locking elements can be rollers arranged to cooperate with the support and with the link by friction and rolling.

In one embodiment, the plurality of self-locking means is distributed along the first drive circle or along the two drive circles.

Advantageously, the link has a first gripping plane appreciably perpendicular to the first and second axis, in which each link portion comprises at least one rigid element, wherein each of the rigid elements comprises a first gripping surface extending into the first gripping plane. Thus, the principal component of the force exerted to grip the link is parallel to the axis.

Advantageously, the link has a second gripping plane, parallel to the first gripping plane, wherein each rigid element comprises a second gripping surface extending into the second gripping plane. The rigidity of rigid elements enables resisting to a pinching force on the two opposite gripping surfaces. The axial components of the pinching forces on said surfaces mutually cancel one another. Only the tangential component of the force cumulates, and this can be sufficiently high to transmit high torque values.

Advantageously, the gripping surfaces that are coplanar and belong to two successive portions of the link are appreciably adjacent so that the locking elements of the mechanism are capable of simultaneously pressing on said adjacent gripping surfaces.

Advantageously, the link is a chain consisting of mutually articulated pitches.

Advantageously, each pitch has a pad having at least one gripping surface appreciably contained in the gripping plane of the chain.

Advantageously, the pads of two successive pitches can have shapes conjugated in such a way that the gripping surfaces of said successive pitches are appreciably continuous with one another, while allowing the articulation of said pitches. This enables the locking element or elements to press on the gripping surface or surfaces as if a continuous plane perpendicular to the shafts were involved. There is no gap liable to block the locking elements.

Advantageously, the first rotary element—or each of two rotary elements—is equipped with a plurality of supports, radially mobile along the corresponding rotary element, wherein each of the self-locking means of the corresponding rotary element comprises at least one rigid locking element integral with the support and one return means designed to bring the locking element into a locking position.

Advantageously, each of the rotary elements equipped with mobile supports comprises a pair of wheels having guides distributed along the two wheels in such a way as to be facing one another, two-by-two, in a plane passing through the first axis; and in which the supports, slidingly mounted on said guides, comprise a connecting portion having an axial extremity that cooperates with one of the guides of one of the wheels, the other axial extremity cooperating with the opposite guide on the other wheel.

Advantageously, the guides of at least one of the wheels form an acute angle with respect to the corresponding axis; and the mechanism comprises a device for axially driving one wheel with respect to the other wheel of the pair of wheels in such a way as to vary the diameter of the drive circle of the link.

Advantageously, each of the supports comprises said first support surface of the locking element integral with the support, the same locking element in locking position pressing on said second support surface in a zone having as its center a point, known as the gripping point.

Advantageously, the first support surface is an appreciably plane locking surface making a locking angle with respect to the first gripping plane.

By gripping point we mean the barycenter of the support forces distributed along the Hertz surface between the locking element and the gripping plane.

Advantageously, the orientation of the locking angle can depend on the direction of rotation of the rotary elements and on the fact that a motor element or receiver of the transmission of power is involved. For the receiving rotary element, this is the link that drives the rotary element. The locking surface is closer to the link downstream from the locking element. That is to say, when the link portion in contact with the locking element is moved in the direction of link movement, the locking element is led to a portion of the locking surface that is closer to the link. That is to say, the locking element is locked even more tightly. The force transmitted by the locking element upon the locking surface reaches sufficient intensity to transmit the torque to the receiving shaft. In the case of the driving rotary element, it is the rotary element that pulls the link, and the locking surface is closer to the link upstream of the locking element.

In a variant, the normal to the locking surface has a supplementary angle with respect to a plane perpendicular to a radius that passes through the gripping point.

Advantageously, the supplementary angle is oriented in such a way that the direction imposed by the return means arrives appreciably parallel to a plane defined as being parallel to the axis and to the strand of the link downstream of the rotary element under consideration, after the gripped link portion has begun to enter the downstream strand.

Advantageously, the supplementary angle is greater than or, ideally, equal to half of the angle from which a portion of the downstream strand is no longer axially facing the locking surfaces, in particular, for the receiving rotary element.

In a variant in which the first or second rotary element is a receiving element of the power transmission, the self-locking means of the receiving rotary element are equipped with locking elements arranged in such a way that the distance of the gripping point from the axis of the receiving element is greater than the distance separating said axis from a neutral line of the link along the corresponding drive circle.

In a variant in which the first or second rotary element is a motor element of the power transmission, the self-locking means of the motor rotary element are equipped with locking elements arranged in such a way that the distance of the gripping point from the axis of the motor element is less than the distance separating said axis from a neutral line of the link along the corresponding drive circle.

In a variant, the Hertz surface assembly relative to the support between the gripping plane and the locking element equipping the receiving shaft is beyond the neutral line of the link with respect to the axis. Alternatively or in combination, the Hertz surface assembly relative to the support between the gripping plane and the locking element equipping the motor shaft can be in front of the neutral line of the link with respect to the axis.

Advantageously, said first and second support surfaces are arranged in such a way that the speed difference between said support surfaces whenever the link portion leaves the drive circle brings about the unlocking of the locking element.

Advantageously, the tangential gripping surface is perpendicular to the first axis or presents, with respect to the plane perpendicular to the first axis, an angle less than the angle of friction between the locking element and the gripping surface.

Advantageously, the link is deformable and inextensible. The inextensibility of the link can be such that transmission of the torque does not result in any significant elongation of the closed loop.

According to another embodiment of the mechanism of power transmission, the plurality of self-locking means is distributed along the link, the tangential gripping surface being the support surface of the first rotary element. Each of the self-locking means comprises at least one rigid locking element integral with a link portion and a return means designed to return the locking element to a locking position. Advantageously, said tangential gripping surface extends appreciably continuously around the first axis and throughout the entire radial zone corresponding to the variation of the diameter of the drive circle.

According to another embodiment, any of the aforementioned mechanisms comprises a plurality of supports rotationally integral with the first rotary element and disposed along the first drive circle.

Each self-locking means has a tangent plane defined as parallel to the first axis and tangent to the closed loop at the site of the self-locking means, and comprises at least one connecting element consisting of a connecting solid or several connecting solids supported two-by-two by a mutual support surface.

When the self-locking means is in a locking configuration, the connecting element rests on one of the supports through a mutual support surface and on a portion of the link through another mutual support surface.

At least one of the mutual support surfaces is a disengagement surface whose normal presents, with respect to the tangent plane, an angle greater than a disengagement angle.

Each connecting element comprises said locking element, consisting of all or part of the connecting solids, the locking element being, in its locking configuration, jammed between two mutual locking support surfaces situated on either side of the locking element.

According to a second aspect, the invention concerns a rotational power transmission mechanism comprising:
- a link extending along a closed loop,
- a first and second rotary element, respectively mobile in rotation around a first and second axis,
- link guide means designed to guide the link along a first drive circle coaxial with the first axis and along a second drive circle coaxial with the second axis, the closed loop comprising an active portion of each of the drive circles, and
- a plurality of supports integral in rotation with the first rotary element and disposed along the first drive circle, and
- a plurality of self-locking means distributed along the active portion of the first drive circle, each of which presents a tangent plane defined as being parallel to the first axis and tangent to the closed loop at the site of the self-locking means,
- wherein each self-locking means comprises at least one connecting element consisting of a connecting solid or several connecting solids supported two-by-two by a mutual support surface,
- wherein the self-locking means is in a locking configuration, the connecting element resting on one of the supports through a mutual support surface and on a portion of the link through another mutual support surface,
- wherein at least one of the mutual support surfaces is a disengagement surface whose normal presents, with respect to the tangent plane, an angle greater than a disengagement angle,
- and wherein each connecting element comprises a locking element consisting of all or part of the connecting solids, the locking element being, in its locking configuration, jammed between two mutual locking support surfaces situated on either side of the locking element.

It can be seen that, in the locking configuration of the transmission mechanism according to this second aspect, the connecting element exerts a force between the link portion and the support, and the intensity of this force is principally due to the jammed locking element. As in the embodiments according to the first aspect of the invention, this force increases with the torque transmitted and does not require that the relaxed transmission strand be stretched. However, according to this second aspect, this connecting force is transmitted, in locking configuration, through mutual contact with the disengagement surface. Because of the angle that the normal to this disengagement surface presents with respect to the tangent plane, this transmission of force ceases once the radial component of the connecting force becomes insufficient to ensure adhesion by static friction on the disengagement surface. This enables self-locking means to self-unlock.

According to either of the aforementioned aspects, an embodiment of the mechanism is such that the mutual support surfaces together define a reference direction, which is the direction of a force that would be transmitted to the support if the link portion exerted a force without radial component upon the connecting element. The disengagement angle is defined as being the smallest angle of inclination of the normal to the disengagement surface with respect to the tangent plane, angle of inclination for which the reference direction is outside the cone of friction on the disengagement surface.

According to another of the aforementioned aspects, an embodiment of the mechanism is such that the disengagement angle is defined as having a tangent equal to the coefficient of friction on the disengagement surface.

According to either of the aforementioned aspects, an embodiment of the mechanism is such that the support presents an overall U shape, receiving the corresponding arriving link portion in the active portion, and in which the link portion is pinched between a force exerted by the connecting element of the self-locking means between a branch of the U and the link portion and a counterreaction having an opposing axial component exercised between the other branch of the U and the same link portion.

According to either of the aforementioned aspects, an embodiment of the mechanism is such that the link portion comprises an actuating surface by which the link portion exercises, whenever it is approached by the corresponding support, an actuating force having a radial component, which actuating force is then transmitted to the support via the connecting element. The angle of the disengagement surface is less than a predetermined maximum angle so that the appearance of the actuating force gives the force exercised by the connecting element between the support and the link portion a direction included in the cone of friction of the disengagement surface.

Advantageously, the self-locking means comprises a jamming return spring arranged to return the locking element in a nominal position parallel or in an appreciably parallel manner to the tangent plane.

Advantageously, the self-locking means comprises a stop that is movable between a rest position defining the nominal position of the locking element and a withdrawn position. The self-locking means also comprises a pretensioned spring arranged to maintain the stop in rest position while the jamming return spring pushes the locking element into a disengaged configuration against the stop. The withdrawn position allows for movement of the locking element in the locking configuration beyond the nominal position.

According to any of the aforementioned aspects, an embodiment of the mechanism is such that at least that mutual locking support surface that is not a disengagement surface has a normal parallel to the tangent plane.

Advantageously, the connecting element is integral with the support.

According to either of the aforementioned aspects, an embodiment of the mechanism is such that the mutual locking support surface whose normal is parallel to the tangent plane belongs to the support and in which the connecting element is indistinguishable from the locking element and comprises a gripping wedge that cooperates with a gripping plane of the link that is also the disengagement surface.

According to either of the aforementioned aspects, an embodiment of the mechanism is such that the connecting element is indistinguishable from the locking element and comprises a longitudinal carriage movable in parallel to the tangent plane; wherein the connecting and locking element also comprises a gripping wedge, located on the longitudinal carriage and sliding radially on the longitudinal carriage along the disengagement surface.

Advantageously, the connecting and locking element also comprises a series of parallel rollers placed between a sliding surface of the longitudinal carriage and the mutual locking support surface belonging to the support.

According to either of the aforementioned aspects, an embodiment of the mechanism is such that the connecting element comprises a radial carriage that slides radially on the support along the disengagement surface. The locking element is located on the radial carriage and the radial carriage comprises the mutual locking support surface.

Advantageously, the locking element comprises a gripping wedge cooperating with a gripping plane of the link and a series of parallel rollers placed between the mutual locking support surface belonging to the radial carriage and a sliding surface of the gripping wedge.

Advantageously, the self-locking means comprises a disengagement spring arranged to radially move a connecting solid supported by the disengagement surface.

According to another aspect, the invention concerns a method of transmitting rotational power between two rotary elements utilizing a link in a closed loop. The method comprises the steps:
  of linking, in which each link portion circulates from one rotary element to another,
  of the self-locking of link portions whenever these are around one of the rotary elements, and
  of the self-locking of link portions whenever these circulate from one rotary element to the other.

Self-locking occurs through the jamming of a locking element between the rotary element and said portion, mechanical power transmission occurring through friction on a surface parallel to the tangent to the corresponding portion of the closed loop.

According to another embodiment, the method of transmitting rotational power between two rotary elements uses a connection in a closed loop surrounding the two rotary elements. The method comprises, for each link portion, a gripping step during which, whenever said portion is situated around one of the rotary elements, said link portion is unified with the corresponding rotary element. Gripping occurs by rolling a locking element into a gripping position between said portion and a support rotationally integral with said rotary element. For each link portion, the method comprises a self-unlocking step by rolling back the locking element, enabling said portion to leave one of the rotary elements and go toward the other.

The transmission mechanism can comprise more than two rotary elements. At least one of the rotary elements drives and at least one of the rotary elements receives. The link portion, which, in the direction of link movement, connects the last receiver element to the first motor element, is called a "stretched strand." The link portion connecting the last motor element to the first receiver element is called a "relaxed strand."

BRIEF DESCRIPTION OF THE DRAWINGS

The present invention will be better understood through an examination of the detailed description of several embodiments used as non-limiting examples and illustrated by the attached drawings, in which:

FIG. 13a is a schematic illustrating the speeds of the support and the link around the motor shaft, FIGS. 13b and 13c illustrate, respectively, the automatic unlocking of the "relaxed strand" and the automatic locking of the "stretched strand" around the motor shaft.

DETAILED DESCRIPTION

Using FIGS. 1 to 13, we shall describe a first family of embodiments, in which the ability of self-locking means to self-unlock whenever said means leaves the active portion of the drive circle, exploits the fact that, whenever a link portion passes from a circular portion to an appreciably rectilinear portion of its trajectory, it is straightened. This straightening is accompanied primarily by a relative movement of said link portion with respect to the immediately upstream portion. This small relative movement is employed to unlock the locking element.

Figure 1:
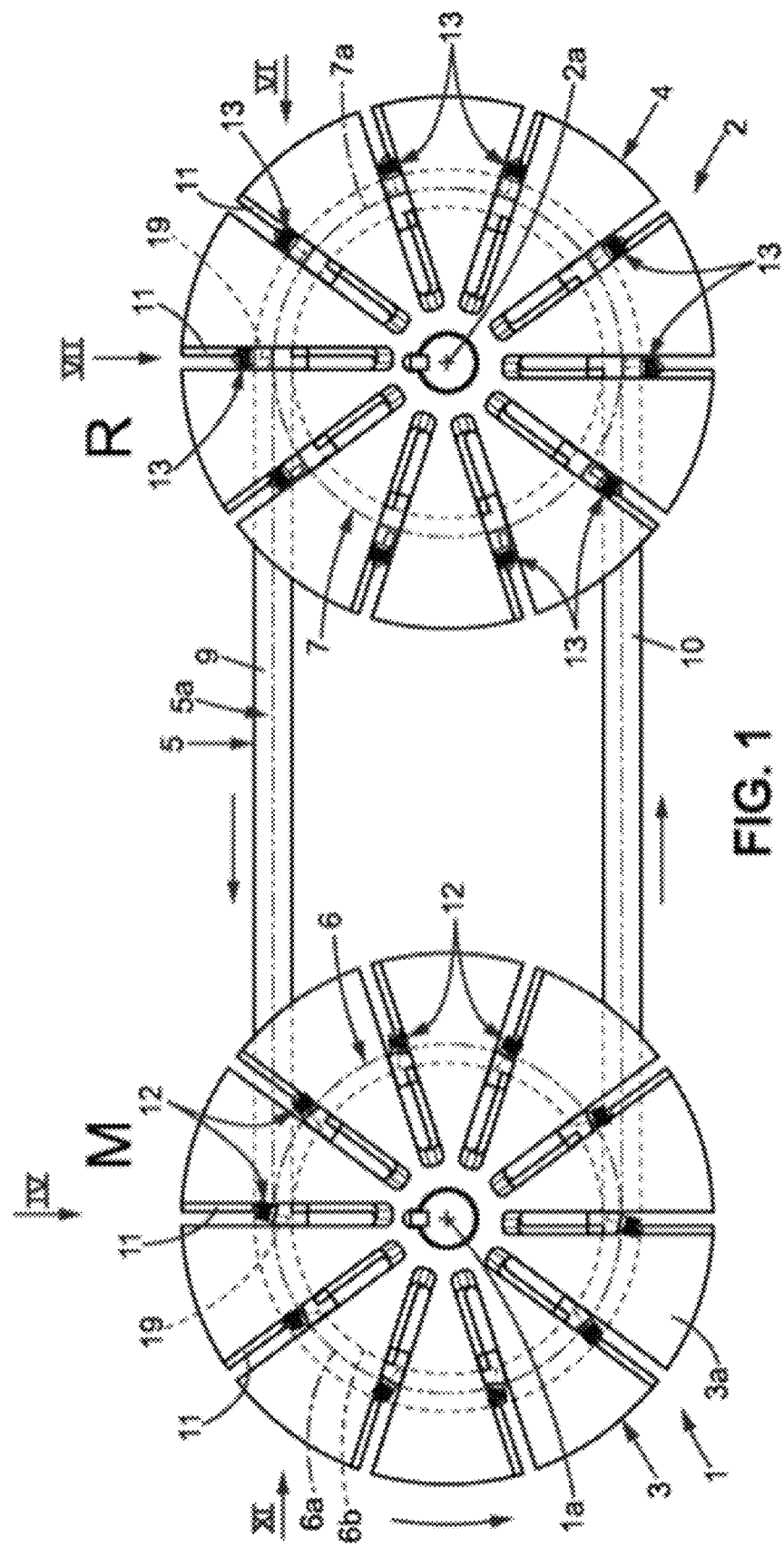
FIG. 1 is a side view of an embodiment of the transmission mechanism as a whole.

As illustrated in FIG. 1, transmission comprises a first driving rotary element, 1, and a second receiving rotary element, 2, rotationally mobile around a first driving axis, 1a, and a second receiving axis, 2a, respectively. Driving rotary element 1 comprises a pair of driving wheels, 3, and receiving rotary element 2 comprises a pair of receiving wheels, 4. The transmission also comprises a link, 5, surrounding driving wheels 3 and receiving wheels 4.

The pair of driving wheels 3 has a drive circle, 6, of link 5 and the pair of receiving wheels 4 also have a drive circle, 7, of the same link 5. Link 5 has two appreciably circular portions surrounding an active portion, 6a, of drive circle 6 and an active portion, 7a, of drive circle 7. Link 5 also has a "stretched strand," 9, extending, in the direction of movement of link 5 upstream of driving wheels 3, as well as a "relaxed strand," 10, extending downstream of driving wheels 3. Throughout the application, we refer to the "upstream side" of a point on the trajectory along which link 5 moves, as the trajectory zone that face a point on the link before that same link point arrives opposite said trajectory point. The downstream side is the trajectory zone that will face a link point immediately afterward. The assembly of two strands 9, 10, appreciably rectilinear, and the two active portions, 6a, 7a, of the drive circles together constitute a closed loop, 5a, along which link 5 extends.

Each of driving wheels 3 and receiving wheels 4 comprises a plurality of grooves, 11, that extend radially from axes 1a, 2a, respectively. Each of grooves of driving wheels 3 is equipped with a self-locking means, 12, that grips link 5 whenever it is located, as a result of the rotation of driving rotary element 1, in the active portion, 6a, of drive circle 6. Similarly, each of grooves 11 of receiving wheels 4 is equipped with self-locking means, 13, which grip link 5 whenever said self-locking means 13 are located in active portion 7a as a result of the rotation of receiving rotary element 2. Each link portion 5 thus passes successively to the stretched strand 9, is then gripped by self-locking means in active portion 6a, is then released from self-locking means 12 and enters relaxed strand 10, then drives receiving wheels 4 by means of the gripping of self-locking means 13.

As will be explained below, self-locking means 12, 13 of the illustrated embodiment are also self-unlocking means 12, 13 because they successively automatically lock link portion 5 arriving on one of wheels 3, 4, then automatically unlock that same link portion whenever it leaves the wheel. In the remainder of the description, the expressions "self-locking means" and "self-unlocking means" refer to the same means.

Figure 2:
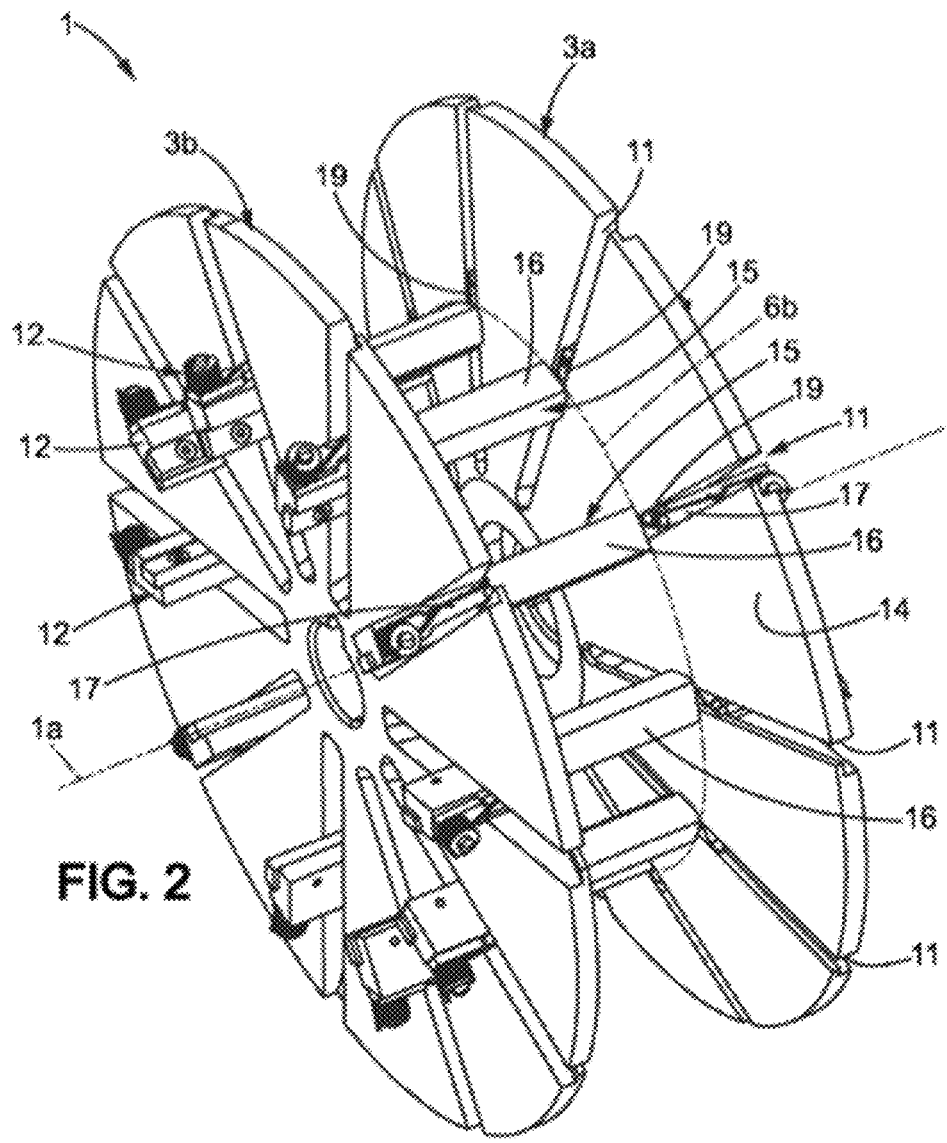
FIG. 2 is a perspective view of a pair of driving wheels.

As illustrated in FIG. 2, the pair 3 of driving wheels consists of a wheel 3a and a wheel 3b each of which has an appreciably conical surface, 14. The conical surfaces of the two wheels 3a and 3b are coaxial with axis 1a of driving rotary element 1 and face one another. Grooves 11 of each of wheels 3a, 3b extend along corresponding conical surface 14. In other words, grooves 11 serve as guides for self-locking means 12. Each guide on the same wheel 3a, 3b makes an acute angle with respect to axis 1a, appreciably identical to said angle of the other guides on that wheel.

Each of self-locking means 12 comprises a support 31, including a connecting portion, 15, extending appreciably parallel to axis 1a and terminating at each of conical surfaces 14 of wheels 3a and 3b, in such a way that a support surface, 16, of each of connecting portions 15 is appreciably tangent to a support cylinder, 6b, coaxial with axis 1a and along which link 5 can rest.

Each of supports 31 comprises, at each of its axial extremities, a means for maintaining and returning 17 a locking element, 19. Means 17 comprises an appreciably articulated arm with respect to support 31, maintaining locking element 19 at the end of the arm, as well as a return spring, 18.

The pair of receiving wheels 4 is strictly identical to the pair of driving wheels 3a and 3b. Rotary element 2 differs from rotary element 1 only in self-locking means 13, which is different from self-locking means 12 and which will be detailed below.

As illustrated in FIGS. 3a to 3d, link 5 can appear in the form of a chain consisting of pitches 20 each of which has an articulation pin, 21, as well as two pads 22a, 22b, fitted onto each extremity of articulation pins 21. Articulation pins 21 are connected by inextensible elements of articulation 23.

Pitches 20 are portions of the link 5, each of which has a longitudinal direction that extends perpendicularly to articulation pins 21 and is sequent to the articulation pin of pitch 20 and to the articulation pin of the immediately previous pitch. The chain extends along closed loop 5a. Whenever a given pitch 20 is in one of strands 9, 10, the longitudinal direction of pitch 20 is indistinguishable from closed loop 5a at the location of pitch 20. When pitch 20 is situated on one of the active portions 6a, 7a, the longitudinal direction of pitch 20 is parallel to and appreciably indistinguishable from the tangent to active portion 6a, 7a at the site of pitch 20. To simply describe the two situations, we can say that link portion 5, represented by pitch 20, has a longitudinal direction that is tangent to closed loop 5a.

Figure 3A:
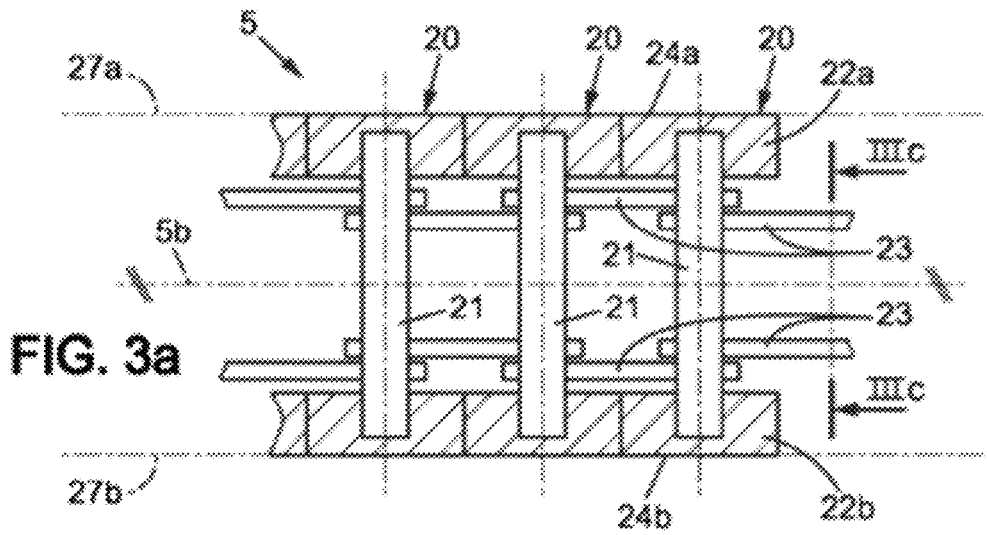
FIGS. 3a, 3b, 3c, and 3d are, respectively, a longitudinal cutaway, a side view, a cross-sectional view, and a detail view of an embodiment of the link.
Figure 3B:
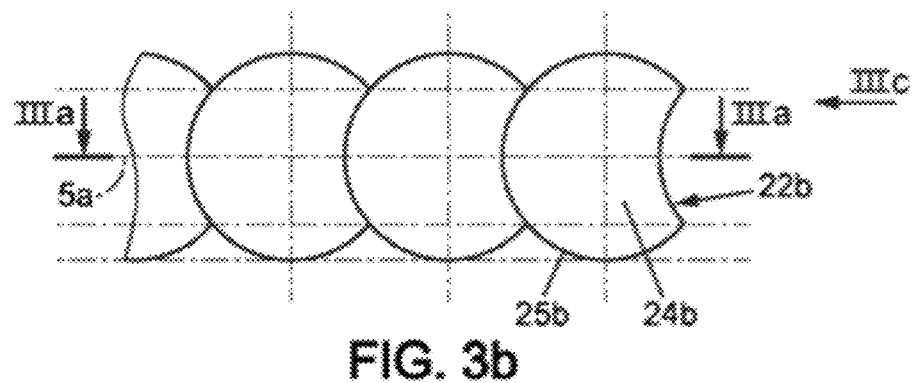

As illustrated in FIG. 3b, each of the pads is presented in the form of a crescent moon and comprises, on one side, a concave circular portion and, on the other, a convex circular portion of the same radius. The radius of the two portions is chosen so that the concave portion of a pitch is appreciably contiguous with a convex portion belonging to the pad of an immediately adjacent pitch 20. Thus, whenever articulation elements 23 pivot around articulation pin 21, the concave portions of the pads also pivot.

Each of pads 22a, 22b has a gripping surface 24a, 24b, opposite one another and appreciably perpendicular to articulation pins 21 of pitches 20. Pads 22a and 22b also have support surfaces 25a and 25b extending axially to the periphery of the convex circular portions of pads 22a, 22b.

Figure 3D:
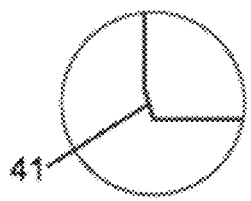
Figure 3C:
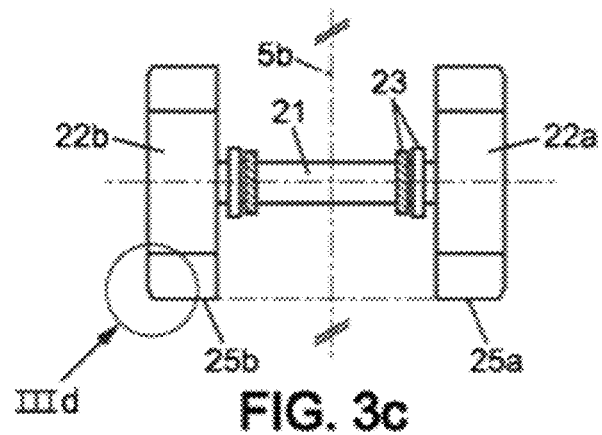

Advantageously, pads 22a, 22b can have a chamfer, 41, illustrated in FIG. 3d, that makes contact with conical surfaces 14. Thus, each pitch 20 of link 5 rests, either on conical surface 14 or on support surface 16 whenever conical surface 14 is interrupted by guide grooves 11. The guide between conical surface 14 and chamfers 41 prevents the guide trajectory of link 5 from being polygonal. This avoids instantaneous variations in the transmission ratio. Moreover, whenever link 5 makes contact with wheels 3 and 4, a residual driving force is produced through friction. However, to transmit power, the system does not require tension on link 5 other than that created by the torque on stretched strand 9. This residual driving force through bevels 41 remains very small with respect to the driving force provided by the self-locking of gripping means 13.

Figure 4:
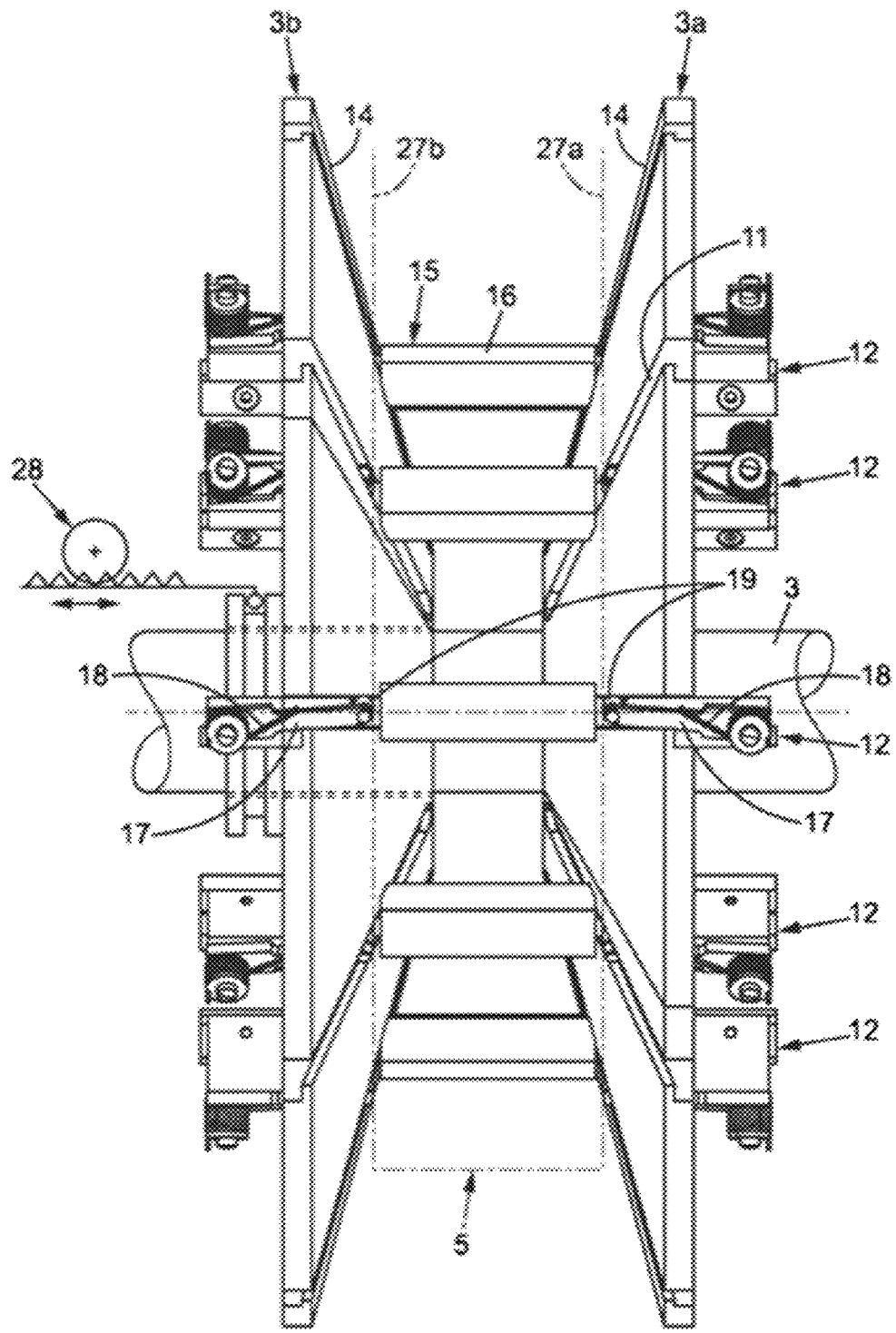
FIG. 4 is a top view of the driving shaft along arrow IV of FIG. 1, FIGS. 5, 6, and 7 are, respectively, a cutaway, a side view, and a top view of a self-locking means of a receiving shaft along, respectively, arrows V, VI, VII, indicated on FIGS. 1, 5, 6, 7.

As illustrated in FIG. 4, chain 5 is winding around drive circle 6a, having support surfaces 25a, 25b of pitches 20, which rest upon support surface 16 of each of connecting portions 15. The diameter of drive circle 6a is equal to the diameter of support cylinder 6b, to which is added twice the radius of support surfaces 25a, 25b.

In general, we call neutral line 37 of link portion 5, the line of the portion that moves at an identical longitudinal speed whether said portion of link 5 is found in active portions 6a or 7a of the drive circles or in stretched or relaxed strands 9, 10. Whenever the link portion passes into active zone 6a, 7a, the distance of neutral line 37 to the shaft axis is equal to the radius of the corresponding drive circle. In the case where link 5 is a chain consisting of articulated pitches 20, neutral line 37 of a pitch corresponds to the position of articulation pin 21 of pitch 20.

Each of support surfaces 16 is appreciably parallel to driving axis 1a. Articulation pins 21 of each of pitches 20 are also appreciably parallel to driving axis 1a. Each of first gripping surfaces 24a of pitches 20 are all appreciably contained in the same first gripping plane 27a, appreciably perpendicular to axis 1a. Likewise, all the gripping surfaces 24b of pitches 20 are appreciably contained in second gripping plane 27b that is also appreciably perpendicular to axis 1a.

The two pads 22a, 22b and articulation pin 21 together from a rigid assembly. Thus, forces parallel to articulated pins 21 exerted on opposing gripping surfaces 24a, 24b, do not affect the articulation between pitches 20.

Driving wheel 3a is fixedly mounted on a driving shaft. However, driving wheel 3b is slidingly mounted axially but always rotationally integral with the driving shaft by means of keys, not shown. It can be seen that whenever wheel 3b is approached by wheel 3a through the actuation of axial drive device 28, the diameter of support cylinder 6b of link 5 increases as well as the diameter of drive circle 6a of link 5.

Advantageously, each of driving wheels 3 and receiving wheels 4 is equipped with a control. These two controls vary in the opposite direction so that the increase of drive circle 6a on driving wheels 3 is compensated by a decrease in the diameter of drive circle 7a of receiving wheels 4, and conversely.

In a variant, the two driving wheels 3a and 3b can be axially free with respect to the driving shaft. In this variant, the axial driving device causes the relative axial distance between the two wheels 3a, 3b to vary.

Figure 5:
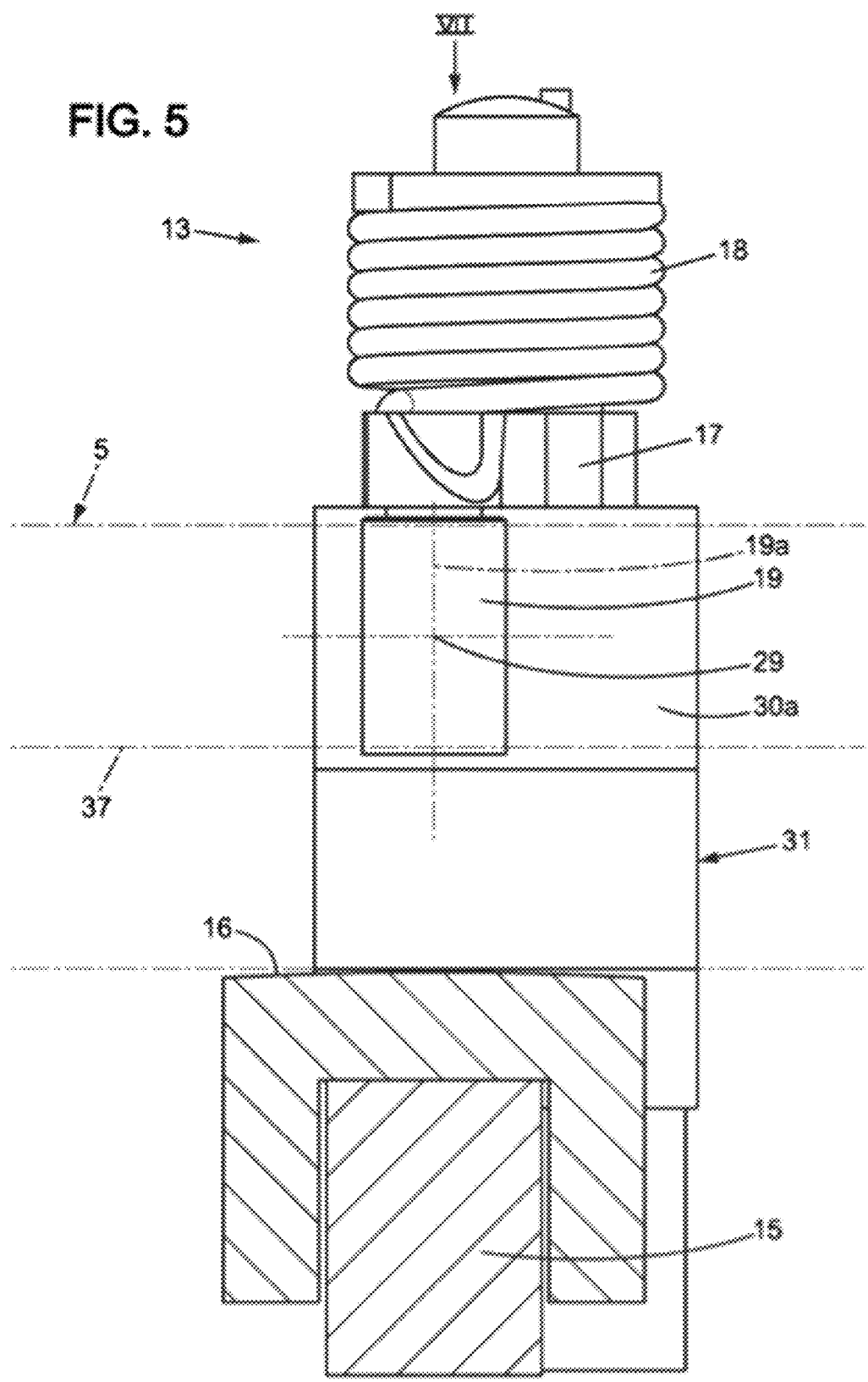

By means of FIGS. 5 to 7, we will describe self-locking means 13 equipping receiving wheels 4. As illustrated in FIGS. 5 and 6, each of self-locking means 13 comprises support 31, including connecting portion 15 and, at each extremity, a means, 17, for maintaining and returning locking element 19. Locking element 19 is a cylindrical roller freely mounted in rotation around axis 19a, appreciably radial with respect to axis 2a of receiving rotary element 2. In a variant, locking element 19 can be a barrel. In all cases, the barycenter of the pressing actions of locking element 19 on gripping planes 27a and 27b is situated at a gripping point, 29, that is radially further distant from axis 2a than neutral line 37 of link 5.

As illustrated in FIGS. 6 and 7, one of locking elements 19 is pushed back by one of maintaining and returning means 17 in such a way as to be locked between gripping plane 27a of link 5 and locking surface 30a of support 31 facing gripping plane 27a of link 5. The other locking element 19 is pushed back by the other maintaining and returning means 17, in such a way that it is locked between gripping plane 27b and locking surface 30b of support 31. The articulation of the two arms 17, with respect to support 31 is such that locking elements 19 maintained by said arms 17 can slide or roll along locking surfaces 30a or 30b. Locking surfaces 30a, 30b are appreciably symmetrical with respect to a plane of symmetry 5b of link 5 which is also perpendicular to axes 1a, 2a and they have a locking angle 36 with respect to the gripping planes. Support 31 provides relative rigidity between the two locking surfaces 30a, 30b.

Figure 8A:
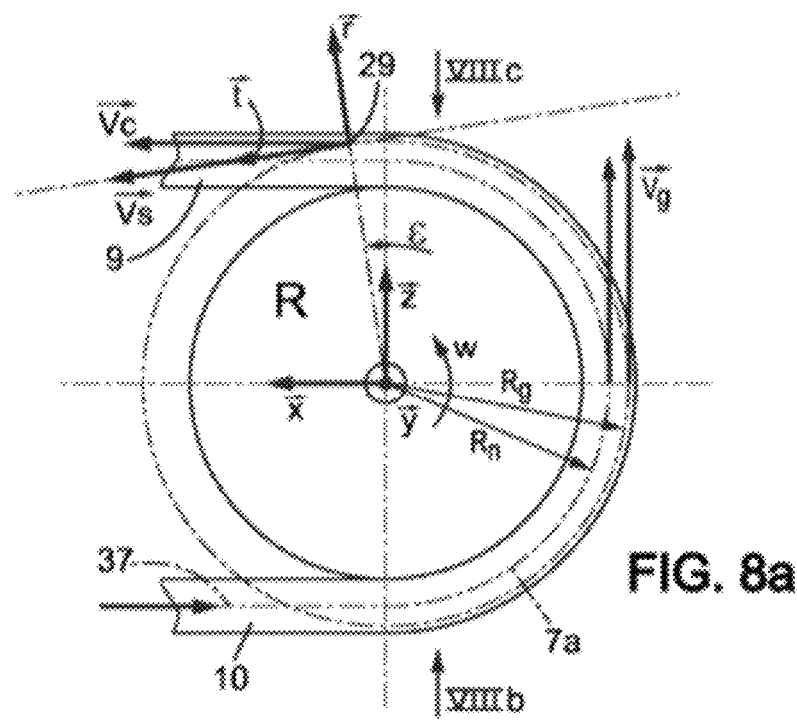
FIG. 8a is a schematic illustrating the speeds of the support and the link around the receiving shaft.
Figure 8B:
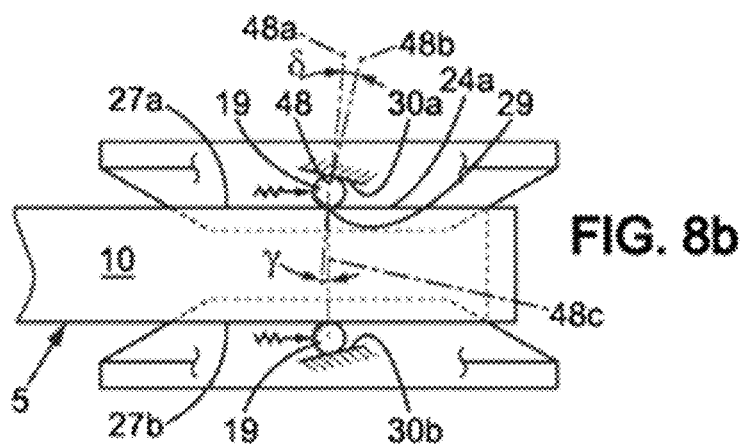
FIGS. 8b and 8c illustrate, respectively, the automatic locking of the "relaxed strand" and the automatic unlocking of the "stretched strand" around the receiving shaft, FIGS. 9, 10. 11, and 12 are, respectively, a perspective view, a cutaway, a side view, and a top view of a self-locking means of a driving shaft along arrows X, XI, and XII, indicated on FIGS. 1, 8, 9, and 10.

As illustrated in FIG. 8b, locking angle 36 of self-locking means 13 of the receiving wheels is oriented in such a way that locking surfaces 30a and 30b get closer to gripping planes 27a, 27b of link 5 on the downstream side of locking element 19 and separate on the upstream side. Maintaining and returning means 17 maintain locking elements 19 against gripping surfaces 24a and 24b and against locking surfaces 30a and 30b. Thus, gripping surfaces 24a and 24b drive locking elements 19, which in turn drive locking surfaces 30a and 30b. Thus, whenever link portion 5 leaves relaxed strand 10 and begins to wind around drive circle 7a, the movement of link 5 drives receiving wheels 4.

More specifically, we consider gripping point 29 as the barycenter of contact pressure forces between locking element 19 and gripping surface 24a of pitch 20 opposite. Let us call "support point" 48 the barycenter of contact pressure forces between locking element 19 and corresponding locking surface 30a, and "line of action" 48a the line passing through support point 48 and gripping point 29. Line of action 48a has an angle γ with the normal 48c to gripping surface 24a and angle δ with respect to the normal 48b to support surface 30a. Whenever locking element 19 is symmetrical in revolution, angles γ and δ are identical and equal to half of locking angle 36. Additionally, jamming occurs when the materials present are such that tg(γ) is less than the coefficient of static friction of locking element 19 on link 5 and tg(δ) is less than the coefficient of static friction of locking element 19 on locking surface 30a of the support.

The link portion that has just been locked continues its travel along active portion 7a. During this travel, each locking element 19 remains jammed between locking surface 30a, 30b and facing gripping surface 24a, 24b. If W is the speed of angular rotation of receiving wheel 4 and $R_n$ the radius of drive circle 7 around which neutral line 37 is wound, the speed of movement, $V_c$ of the link along its neutral line 37 is $V_c = W \cdot R_n$. On the other hand, because gripping point 29 is radially situated beyond neutral line 37 at radius $R_g$, the linear speed $V_g$ of the assembly of surface 30a, locking element 19, and gripping surface 24a opposite, considered at gripping point 29, is $V_g = W \cdot Rg$. This is greater than the linear speed $V_c$ of the link.

Figure 8C:
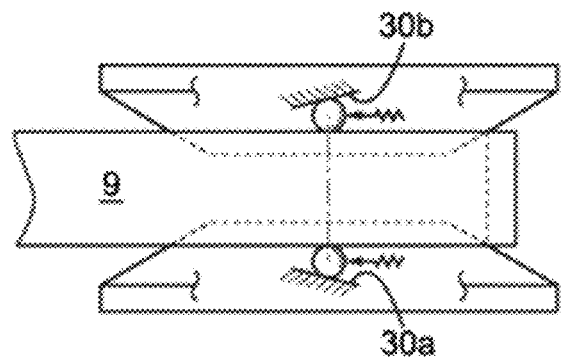
Figure 9:
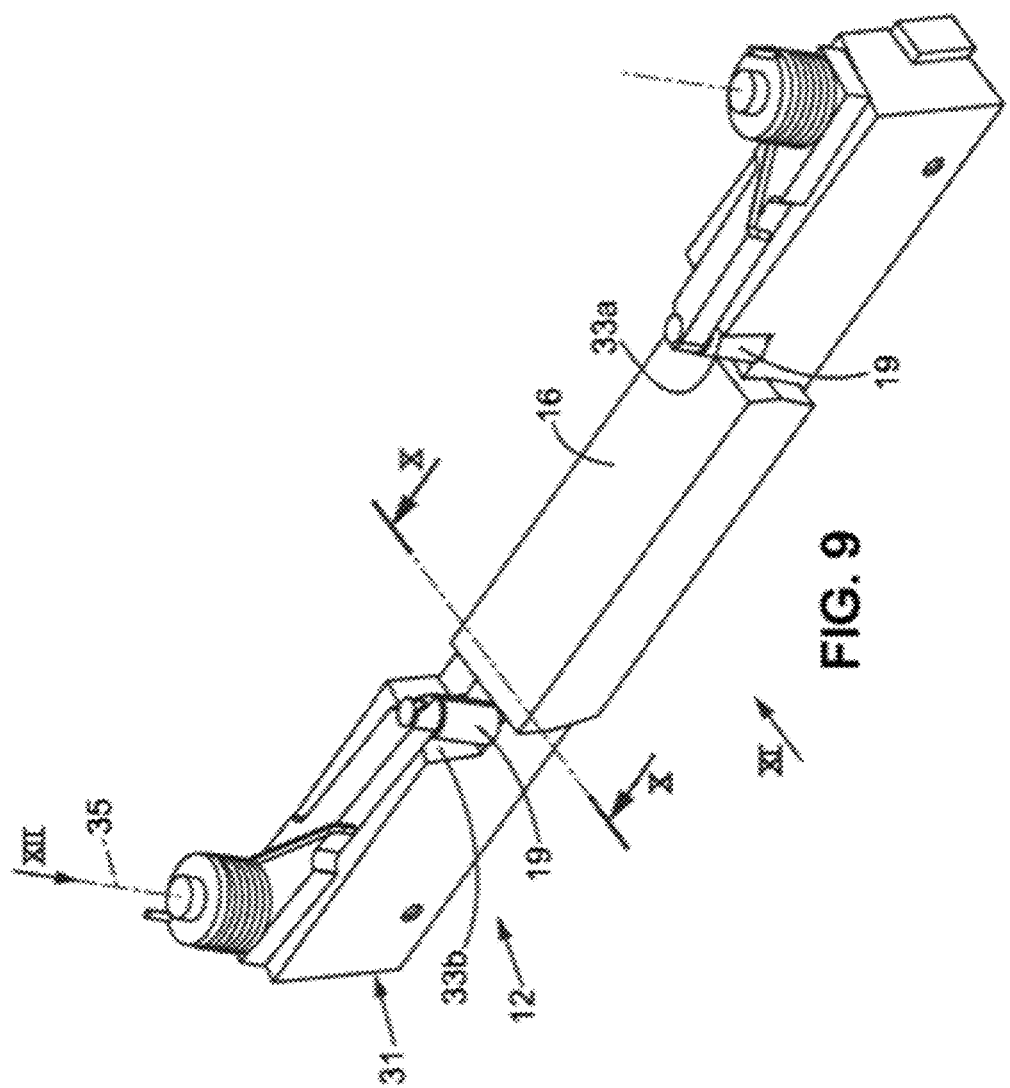
Figure 10:
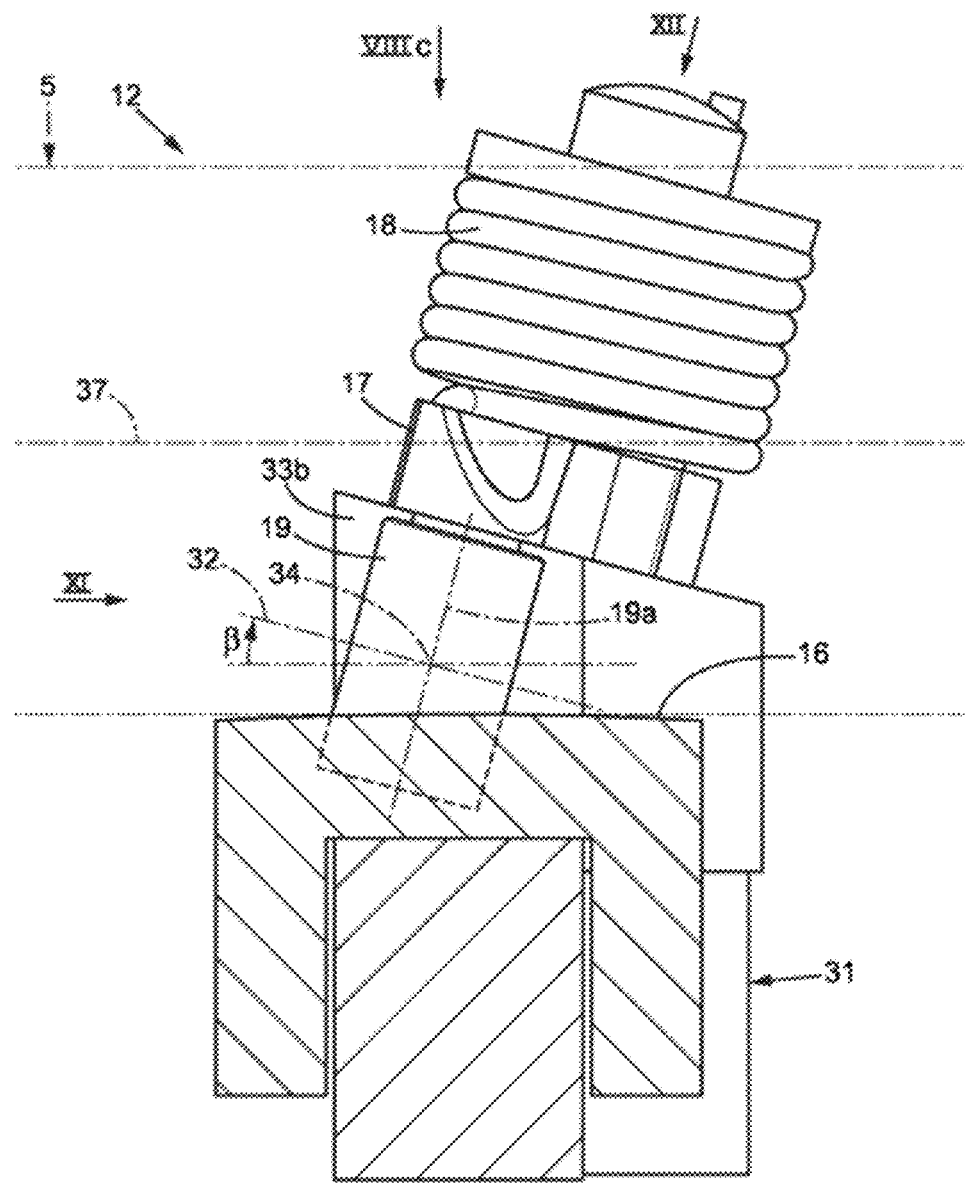

Now consider a link portion 5 such as pitch 20, having traveled through angle ε in stretched strand 9, that is to say, having just entered into stretched strand 9. Locking element 19 remains potentially mobile along a locking direction in a plane (t', y') where t' is tangent to the circle around which locking element 19 travels and y' is parallel to shafts 1, 2. To determine whether locking element 19 is automatically locked or unlocked, we compare the linear speeds of the point of locking surface 30a that was bound by element 19 and the point of gripping surface 24a that was bound by the same element 19. Therefore, we consider the different actual speeds in a centerline connected to support 31, primarily projecting them in the plane (t', y'). Thus, locking element 19 sees in plane (t', y'), on the one hand, a locking surface animated by a linear speed $V_s = W \cdot R_g$ and, on the other hand, a gripping surface 24a that is slowed down and has a speed $V_c$ whose projection on plane (t',y') is $V_c = W \cdot R_n \cdot \cos \epsilon$. In other words, whatever value ε has, the situation always obtains whereby $V_c < V_s$. Referring to FIG. 8c, we see that the slowing of link 5 results in automatically unlocking self-locking means 13.

We will now describe, using FIGS. 9 to 13, the operation of self-locking means 12 equipping the driving wheels. As with self-locking means 13, we find a locking element 19 driven in locking direction 32 by maintaining and returning means 17. Locking element 19 is jammed between a locking surface 33a, 33b situated opposite the same gripping surfaces 24a, 24b of link 5.

Locking element 19 presses on the gripping surface opposite 24a, 24b at gripping point 34.

In the embodiment illustrated, self-locking means 12 have two differences with respect to self-locking means 13. On the one hand, return arm 17 is appreciably articulated around axis of rotation 35 inclined in such a way that locking direction 32 has a supplementary angle β with respect to the plane perpendicular to the radius and passing through gripping point 34. On the other hand, gripping point 34 is positioned in such a way that it is at a distance $R_g$ from axis 1a, which is less than the distance separating neutral line 37 from link 5 of axis 1a.

As illustrated in FIG. 13c, locking surfaces 33a, 33b are situated so that they approach gripping plane 27a, 27b, upstream of locking element 19. Maintaining and returning means 17 brings locking element 19 into contact with locking surface 33a, 33b and with gripping surfaces 24a, 24b opposite. When a driving torque is exerted on driving wheel 3, locking surface 33a, 33b pushes locking element 19, which rolls along gripping plane 27a, 27b of link 5 until it augments the jamming and brings about the relative immobilization of link 5 with respect to support 31.

Throughout the entire travel along active portion 6a of drive circle 6, locking surfaces 33a, 33b, locking element 19, and the portions facing gripping surfaces 24a, 24b remain immobile with respect to one another and are propelled with a tangential speed $V_g = W \cdot R_g$.

Now consider a link portion having traveled through angle ε in relaxed strand 10, that is to say, having just entered into relaxed strand 10. The relative speeds seen by locking element 19 are to be considered at reference position (u', y') determined by axis of rotation 35. Locking surface 33a, 33b is operated at a speed whose intensity is $V_s = W \cdot R_g$ and which is inclined to the plane of the direction of locking (u',y') of said constant angle β. Gripping point 34 of link 5 has a speed of intensity $V_c = W \cdot R_n$, which is parallel to the relaxed strand 10, that is to say, has an angle β-ε with respect to plane (u', y'). Referring to FIG. 13b, we see that the unlocking condition of self-locking means 19 is in the centerline (u', y'): $V_s < V_c$. In other words, the automatic unlocking condition is written, when projected onto the reference position, (u',y'):

$$W \cdot Rg \cdot \cos \beta < W \cdot R_n \cdot \cos(\beta - \epsilon).$$

Advantageously, angle β is chosen to be greater than or, ideally, equal to half of θm, which is the angle from which relaxed strand 10 is no longer facing locking surfaces 33a, 33b. Thus, for every ε comprised between 0 and θm: ε≤2·β, therefore cos(β)≤cos(β-ε). However, given the radial position of gripping point 34, $R_g < R_n$, and therefore the automatic unlocking condition is realized for every ε comprised between 0 and θm.

The above embodiment can be combined with numerous variants.

Figure 14A:
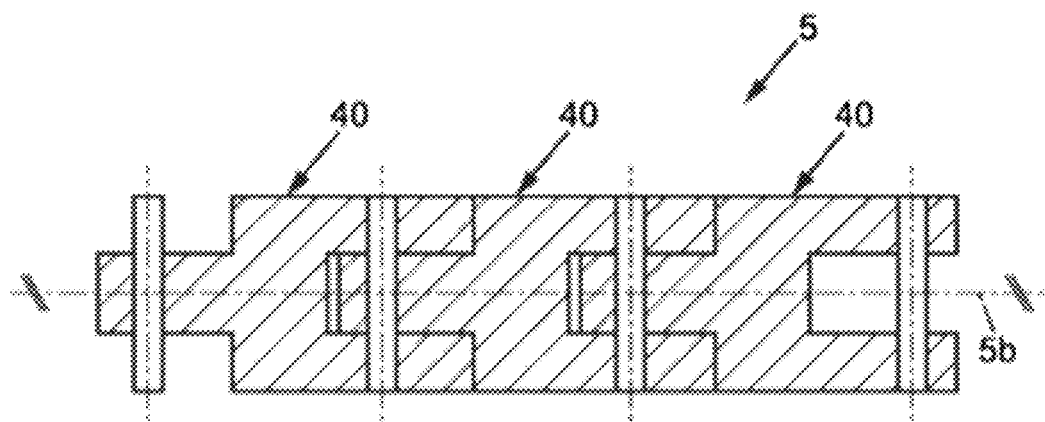
FIGS. 14a and 14b illustrate, respectively, a longitudinal cutaway and a side view of a variant of the link.
Figure 14B:
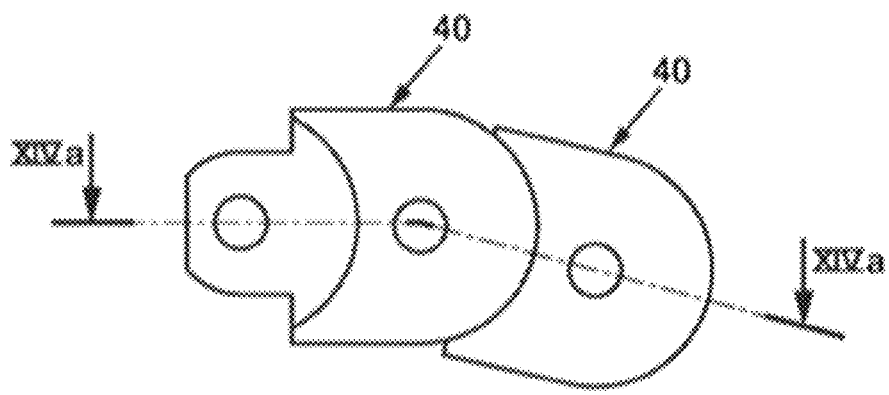

Link 5 can be a chain, illustrated in FIG. 14, with pitches 40 whose gripping surfaces belong to a rigid element distinct from the articulation pin.

The gripping surfaces have a straight portion. Such a shape has a usable surface for gripping that is relatively larger than the variant illustrated in FIGS. 3a to 3d.

In another variant, link 5 can be an unarticulated belt. Advantageously, the belt can contain an inextensible core as well as a series of metallic inserts extending transversely to the belt in such a way that it is capable of absorbing very high pinching forces without affecting the flexibility of the belt when flexed.

Locking element 19 of self-locking means 12 can have a shape identical to or different from that of the locking element of self-locking means 13. The locking elements of the same self-locking means can be identical or different and can vary among self-locking means guided by different guides.

In a variant, the locking elements can be balls 44 (FIG. 15b) or barrels. Alternatively or in combination, locking elements can cooperate with gripping surfaces over a more extensive surface so as to reduce the Hertz pressure. This is the case with cams 42, 45 and 46 of FIGS. 15a, 15c and 15d.

Moreover, the locking element does not have to be movable at the end of guide arm 17. This is the case with cam 46, illustrated in FIG. 15d.

Figure 15A:
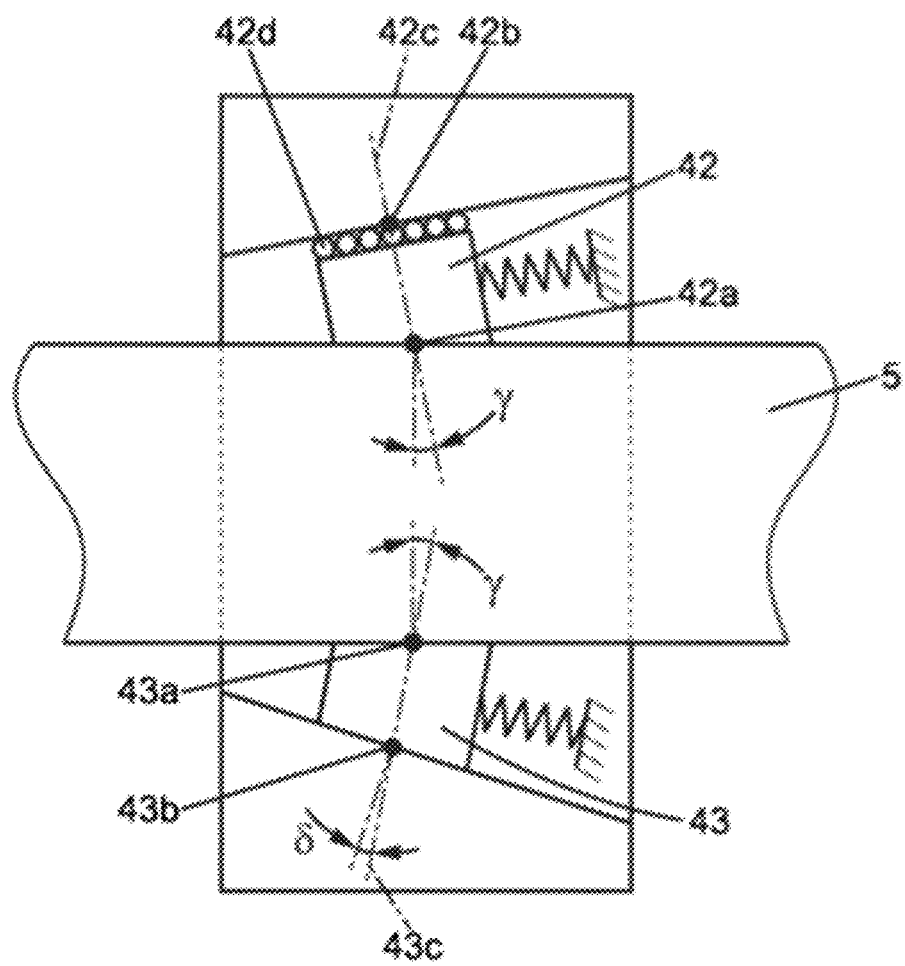
FIGS. 15a, 15b, 15c and 15d illustrate variants of self-locking means.
Figure 15B:
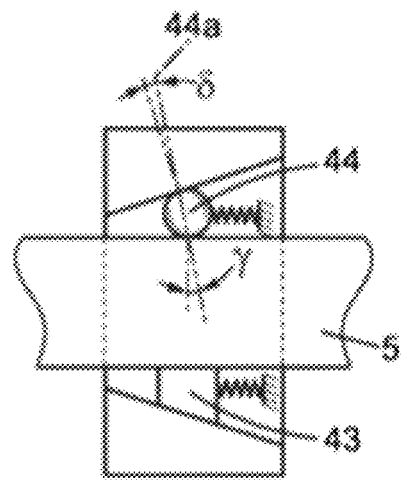

As shown in FIG. 15a, unification means comprises a support equipped with locking element 42 and locking element 43. Locking element 42 can be a subassembly comprising a support pad on the side of link 5 and rolling elements 42d on the support side. The locking surface is inclined at an angle $\gamma$. The absence of static friction on the locking surface means that the force exerted by each rolling element 42d is perpendicular to the locking surface. These appreciably have the same intensity. Thus, barycenter 42b of the forces is appreciably at the center of the rolling elements. Likewise, barycenter 42a of the forces of the support pad on link 5 is also appreciably at the center. Jamming takes place once line of action 42c presents an angle $\gamma$ whose tangent is less than the coefficient of friction of the support pad with the tangential gripping surface of link 5. Locking element 42 is self-unlocking once the link moves relative to the support to the right of FIG. 15a.

In an alternative, the rolling elements can be replaced by a layer of material of low coefficient of friction, such as Teflon (R) or a film of oil.

Locking element 43 rubs against link 5 and the support. The line of action 43c is appreciably inclined at the same angle $\gamma$ to the normal to link 5. The locking surface is inclined at an angle $\gamma+\delta$. Jamming occurs whenever $tg(\gamma)$ and $tg(\delta)$ are simultaneously less than the coefficients of friction of locking element 43 with the corresponding support surfaces. Locking element 43 considered in isolation is not self-unlocking. However, the fact that locking element 42 is, is sufficient for the unification means illustrated in FIG. 15a to be self-unlocking whenever the support reaches the end of the active portion of a drive circle.

Figure 15C:
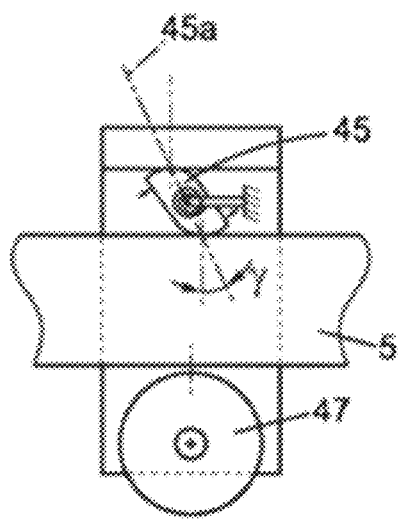
Figure 15D:
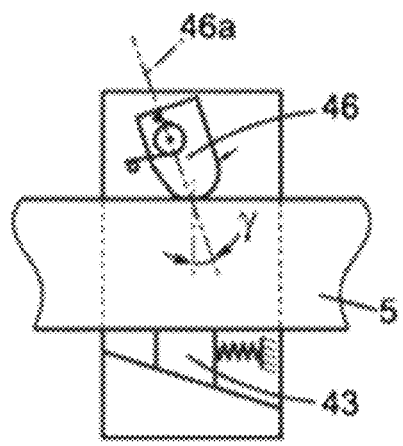

FIG. 15c illustrates an embodiment wherein the supports are equipped with a single locking element, the counter-reaction of the locking force being provided by freely rotating wheel 47. In another embodiment, which is not shown, the counter-reaction of the locking effort is provided by a shoulder of support 31 itself, which is parallel to link 5. These variants can be combined with all the other embodiments.

In all the embodiments illustrated in FIGS. 15a to 15d, jamming of the locking element, respectively 42, 44, 45, 46, occurs because the corresponding line of action 42c, 44a, 45a, 46a is inclined at an angle $\gamma$ whose tangent is less than the coefficient of friction of the locking element on link 5. This condition is necessary, it may not be sufficient.

In a variant, the locking element can be integral, even one-piece with the support or the link. The locking element is then elastically deformable with respect to the remainder of the part with which it is integral.

In another variant, the mechanism can be bidirectional, each wheel being capable of serving alternately as driver or receiver in this case; each of the wheels can be equipped with a plurality of self-locking means 12 of the driver type and a plurality of self-locking means 13 of the receiver type. However, only one of the two pluralities is active on the same wheel. Arm 17 can be equipped with disengaging means enabling the locking element to be separated from link 5 so as to deactivate the corresponding self-locking means.

In another variant, the variation of the diameter of drive circles 6 and/or 7 can be obtained without a conical surface and/or without the inclination of the guides to the axes.

In a variant, the mechanism can comprise a single shaft equipped with self-locking means of the driver type and/or of the receiver type. The other shaft can be equipped with conventional gripping means, such as a sprocket. In the case where the drive diameter of self-locking means is variable, it can be beneficial to add a wheel to stretch the flexible strand.

The mechanism offers numerous industrial applications that make use of rotational movement. For example, it can be used to reduce the energy consumption of a vehicle or to improve the production of energy in a generator.

Using FIGS. 16 to 24, we will describe a second family of embodiments of the invention, which differ from the embodiments described above in their self-locking means. The ability of these self-locking means to self-unlock makes use of a phenomenon that differs from the one illustrated in FIGS. 5 to 13. In the previously described embodiments, the link portions wind around conical surfaces 14 or on support surface 16 of support 31 in such a way that the radial force exerted by the link portion grasped by a self-locking means is directly transmitted by support 31 and not by locking element 19, 42, 43, 44, 45, 46.

In the family of embodiments described below, the radial force exerted by the link portion as a result of the transmission of a torque is transmitted to the locking element then to the support before reaching the driving or receiving wheels. The ability of the self-locking means to self-lock and to self-unlock makes use of the appearance and disappearance of a radial force component exerted by the link portion, depending on whether it is located in the wound portion or in the rectilinear portion of the link trajectory. However, this second family of embodiments of the invention, preserves the fact that the pinching force of the link portion occurs through the jamming of a locking element.

In a manner similar to the embodiments previously described, the following embodiments comprise a first and second rotary element 1, 2 mobile around their respective axes 1a, 2a. Rotary elements 1, 2 are each composed of a pair of conical wheels, such as wheels 3a, 3b. Each of the embodiments of this second family comprises a support 50 in the general shape of a U, having two uprights 50a, 50b corresponding to the sides of the U-shape, and an axial part 50c of support 50, corresponding to the bottom of the U and appreciably parallel to axes 1a, 2a. Each of uprights 50a, 50b slides appreciably radially in radial groove 11 of the corresponding wheel of rotary element 1, 2. Support 50, integral in rotation with the corresponding rotary element, is situated on circle 6, 7 as long as the mechanism does not change the transmission ratio.

Each self-locking means receives a portion 20 of link 5 and defines a tangent plane 51, which is parallel to axes 1a, 2a and tangent to closed loop 5a at the center of the forces exerted by the self-locking means on portion 20 of the link. We define an axial direction "x" as being the direction parallel to axes 1a, 2a, a longitudinal direction "y" as the direction tangent to closed loop 5a at the center of the forces exerted on link portion 20, and a radial direction "z" as the direction perpendicular to tangent plane 51.

The self-locking means that will be described are appreciably symmetrical to plane 5b of symmetry of link 5 and only one half of these self-locking means will be described. However, this symmetry is not obligatory and variants can combine the halves of different self-locking means of this same second family of solutions. We can also combine a self-locking means half corresponding to an embodiment of this second family with another self-locking means half illustrated in FIGS. 1 to 13 or in any of the variants illustrated in FIGS. 14a, 14b, 15a, 15b, 15c, and 15d.

Figure 16:
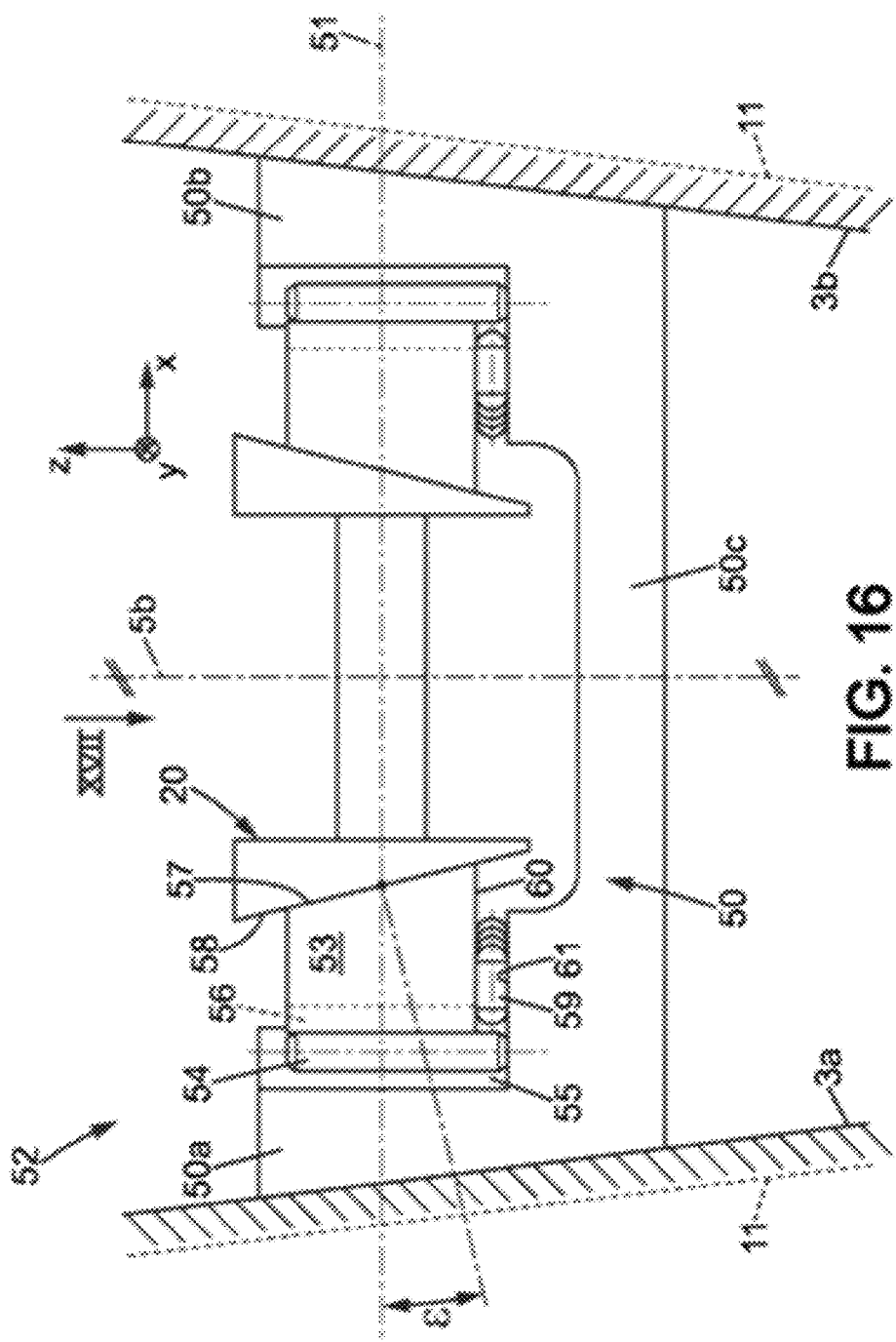
FIG. 16 is an end view of a first embodiment of self-locking means for a second family of embodiments of the invention.
Figure 17:
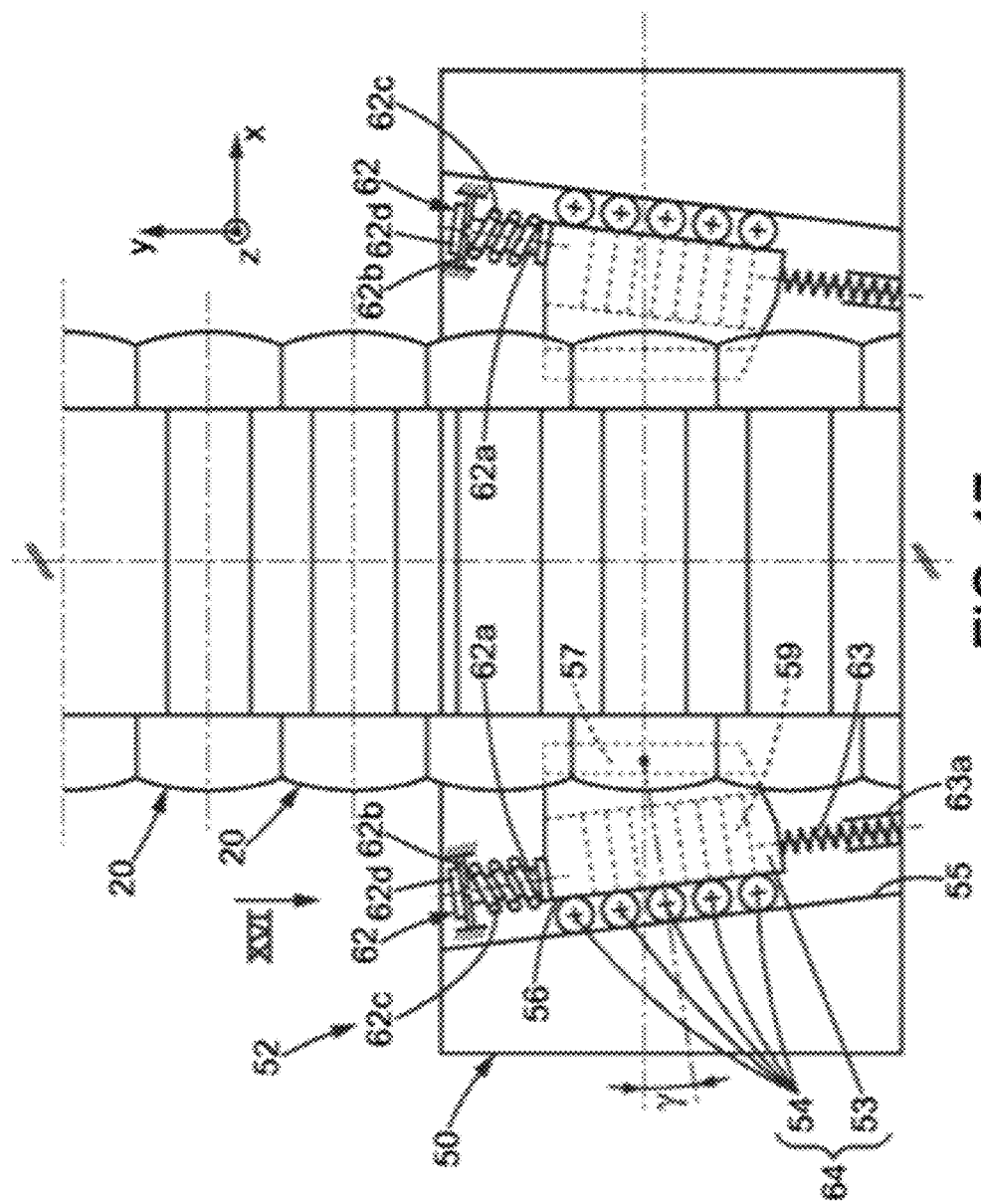
FIG. 17 is a top view along arrow XVII of FIG. 16.

As shown in FIGS. 16, 17, the first embodiment of this second family comprises self-locking means 52 comprising support 50, a pair of gripping wedges 53, and a series of principal rollers 54, whose axes are parallel to direction z. Principal rollers 54 are positioned between a first surface 55, belonging to upright 50a, and a second surface 56, belonging to gripping wedges 53. Each gripping wedge 53 has a third surface 57 that rests on gripping plane 58 of link portion 20.

Self-locking means 52 can comprise, as illustrated, auxiliary rollers 59, positioned between a fourth surface 60, of gripping wedge 53 and a fifth surface 61, of the axial part, 50c, of support 50. In a variant of self-locking means 52, fourth surface 60 and/or fifth surface 61 are covered with a layer with a low coefficient of friction and rest upon one another.

Third surface 57 is advantageously planar and parallel to gripping plane 58, and presents a normal included in a plane (x, z), and is inclined to the axial direction x of an angle $\epsilon$, visible in FIG. 16.

As shown in FIG. 17, first surface 55 and second surface 56 are advantageously plane and parallel and have a normal included in tangent plane 51, and are inclined to the axial direction x of a jamming angle $\gamma$.

Self-locking means 52 also comprises a movable stop 62, consisting of body 62a movably mounted in translation, appreciably parallel to tangent plane 51 in guide 62b affixed to support 50 and of a pretensioned spring 62c. Spring 62c is mounted in such a way as to push stop 62d of body 62a against guide 62b and thereby define a rest position of movable stop 62. Body 62a is, however, movable toward a withdrawn position on the side where first surface 55 separates from plane 5b of symmetry. Self-locking means 52 also comprises a return spring 63, compressed between gripping wedge 53 and a stop 63a, affixed to support 50.

Figure 18:
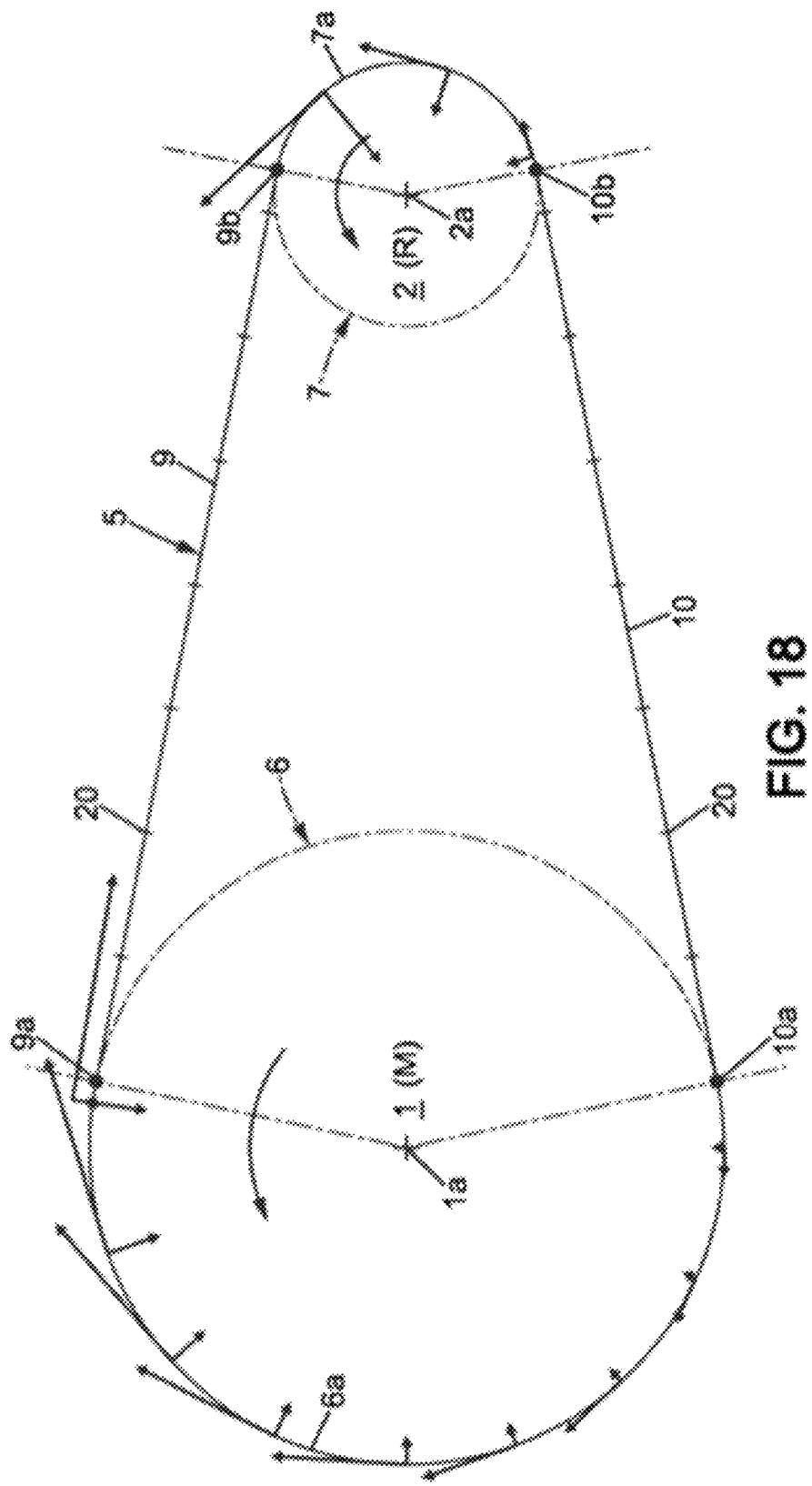
FIG. 18 illustrates the distribution of forces exerted by the link on the rotary elements.

FIG. 18 represents the forces exerted by link 5 on each of rotating elements 1, 2. Rotary driving element 1 turns in the direction indicated by the arrow. Strand 9 is stretched and link portions 20, meshed with rotary driving element 1, exert a force resisting to the rotation of rotary element 1. Each of link portions 20 are placed in longitudinal tension with the part of the portions immediately upstream and downstream of said portion. This longitudinal tension decreases progressively from the link portions located near a point 9a, at the start of winding to a point 10a, at the end of winding, finally achieving a residual tension in relaxed strand 10. Conversely, the tension exerted by link 5 on link portion 20 on rotary receiving element 2 increases progressively from the portions situated near a point 10b, at the start of winding up to a point 9b, at the end of winding.

Each link portion 20 situated in one of the active portions 6a, 7a of drive circles 6, 7 exerts a radial force that is proportional to the longitudinal tension to which link portion 20 is subject. This radial force appears whenever portion 20 reaches point 9a, 10b at the start of winding and disappears at point 10a, 9b at the end of winding.

We will now describe the operation of self-locking means 52. When support 50 is in a non-active portion of circle 6, this support experiences no force from link 5, and gripping wedge 53 is pushed by return spring 63 into a nominal position against movable stop 62. When support 50 approaches point 9a, 10b at the start of winding, this support 50 is approached radially by a link portion. Angle $\epsilon$ of gripping plane 58 is oriented in such a way as to repel gripping wedge 53 toward the exterior. Gripping wedge 53 remains in position as long as pretensioned spring 62 is able to resist this force. Thus, the pressure increases between third surface 57 and gripping plane 58. Because of the residual elasticity of support 50 and the low stiffness of return spring 63, the friction between third surface 57 and gripping plane 58 is accompanied by a slight pull of the gripping wedge 53 along longitudinal direction "y" in the direction in which second surface 55 approaches plane of symmetry 5b. The phenomenon of jamming is then produced. The pressure increases until the reaction of gripping wedge 53 compensates for a part of the longitudinal tension in link 5 at this location. In effect, the tension on stretched strand 9 is distributed among the various supports 50 that are in active portion 6a of drive circle 6. Thus, all the supports of active portion 6a globally receive the difference in tension between the tension on stretched strand 9 and the residual tension on relaxed strand 10.

The mechanical connection between support 50 and link portion 20 is supplied by the stacking of gripping wedge 53 and principal rollers 54, which constitute connecting solids 53, 54. The assembly of connecting solids 53, 54 constitutes connecting element 64. Third surface 57 and gripping plane 58 are mutual support surfaces 57, 58 of connecting element 64 on link portion 20. First surface 55 is a mutual support surface 55 of connecting element 64 on support 50 and second surface 56 is a mutual support surface between connecting solids 53, 54.

In self-locking means 52, connecting element 64 is also a locking element, 64, that is jammed between first surface 55 and gripping plane 58. In other words, first surface 55 and gripping plane 58 each constitute mutual locking support surfaces 55, 58.

Figure 19:
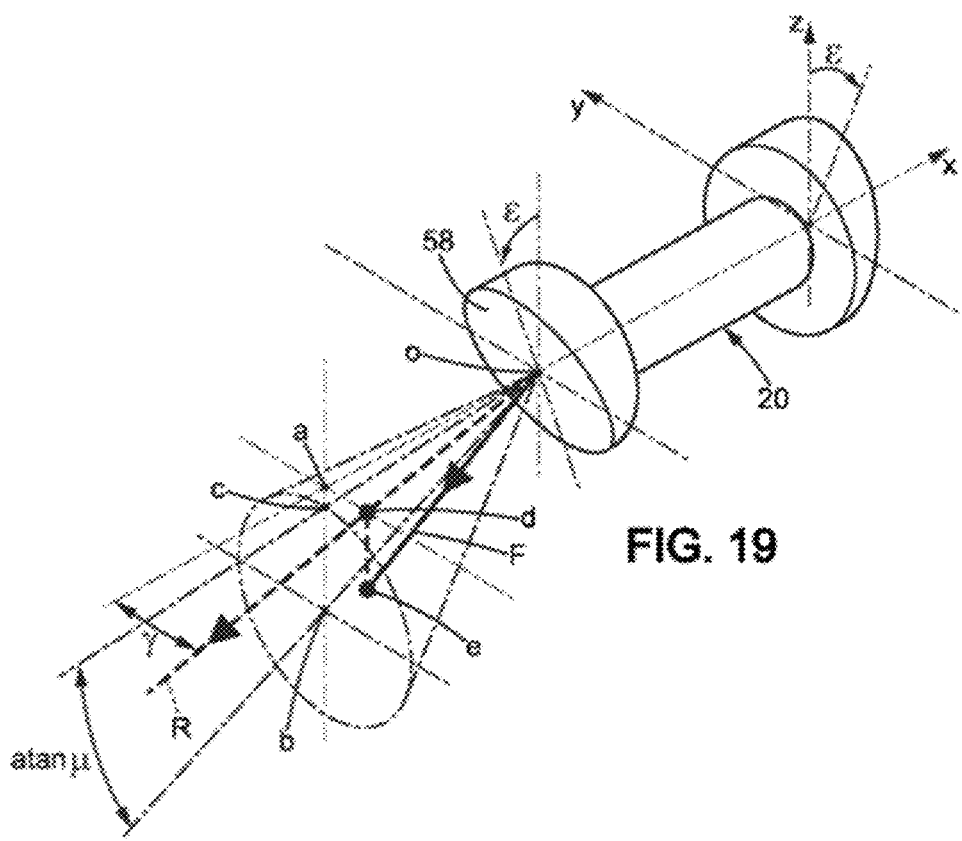
FIG. 19 illustrates the direction of the forces exerted by a link portion on the connecting element when the self-locking means of FIGS. 16 and 17 is in locking configuration (bold solid line) or in disengagement configuration (bold dashed line)

Using FIG. 19, we will describe the equilibrium condition of each self-locking means 52 in locking configuration. A connecting force F exerted by link portion 20 on connecting element 64 is shown by the bold line. If "O" is the center of application of force F between third surface 57 and gripping plane 58, and "a" is a point on the axis parallel to the axis passing through "O," the points of intersection of the different directions passing through "O" are shown by the intersection of this direction with the plane (a, y, z). The normal to gripping plane 58 is shown by point "b" on axis (a, z). The friction cone characterizing the static equilibrium between mutual support surfaces 57, 58 is shown in bold chain-dotted lines. A point "c" such that the tangent to the angle (b, 0, c) is equal to the coefficient of friction $\mu$ on mutual support surfaces 57, 58. A point "d" on axis (a, y) such that angle (a, 0, c) is the angle of inclination $\gamma$ of first surface 55. The direction shown in bold dotted lines passing through point "d" is a reference direction, R, that corresponds to the connecting force that would be transmitted to support 50 if there had been no radial component to the force F actually exerted. This corresponds to the force that would be exerted by a link portion subject to the same longitudinal tension, the link being rectilinear and tangent to drive circle 6, whereas only first surface 55 resists this force.

The actually exerted force, F, is then illustrated by point "e" at the vertical of point "d."

The equilibrium condition of link portion 20 on support 50 in locking configuration is such that the actually exerted force F (point e) is in the cone of friction.

As shown in FIG. 18, when self-locking means 52 traverses active portion 6a of the driving wheel, the radial component appears at point 9a, gradually diminishes, and is canceled at point 10a. In traversing active portion 7a of the receiving wheel, the radial component appears at point 10b, increases gradually, and falls suddenly at point 9b.

The condition for unlocking the link when link portion 20 leaves active portion 6a, 7a is that point "d" is outside the cone of friction.

In other words, whenever the radial component due to the winding of the link decreases, surfaces 57 and 58 slide over one another and constitute disengagement surfaces 57, 58.

In self-locking means 52, surfaces 57, 58 are also actuating surfaces 57, 58, for it is through them that the radial force that link portion 20 exerts on the corresponding rotary element is transmitted.

It can be seen that if the tangent of the angle of inclination ϵ of gripping plane 58 is greater than the coefficient of friction, "μ" the automatic disengagement condition is then fulfilled. However, disengagement can occur even if tan(ϵ)<μ. At this point, reference direction R remains outside the cone of friction.

We will now describe the way in which movable stop 62 can be used to change the transmission ratio while torque is being transmitted. Consider two successive self-locking means 50 in active position 6a, 7a while the diameter of corresponding drive circle 6, 7 changes. If this diameter increases, the upstream self-locking means blocks the link and pulls the link portion meshed with the downstream self-locking means toward it. Stop 62 of this downstream self-locking means withdraws and releases the locking. This enables the link to slide longitudinally in the downstream self-locking means in such a way that it adapts to the increase in the diameter of the drive circle. The upstream self-locking means continues to transmit torque to the rotary element during this adaptation.

Conversely, if the diameter of the drive circle decreases, the axial tension is completely absorbed by the upstream self-locking means and the decrease in diameter causes the tension experienced in the downstream self-locking means to fall. This also causes the radial force exerted by the link portion supported by the downstream self-locking means to fall. This drop in tension and radial force brings about the disengagement of downstream self-locking means 52 until the length of the link between the two successive supports decreases to a desired value. During the decrease in diameter, only the self-locking means furthest upstream resists the tension and transmits the torque to the rotating element. Once the desired diameter of the drive circle has been achieved, the gripping of newly arrived link portions in the active portion takes over. The tension assumed by each of the self-locking means is gradually equilibrated.

A variant not shown of self-locking means 52 comprises a support 50 having a first surface whose normal is inclined to aforementioned plane (x, z) of angle γ and to aforementioned plane (x, y) of angle ϵ. There is no further need of auxiliary rollers 59.

Figure 20:
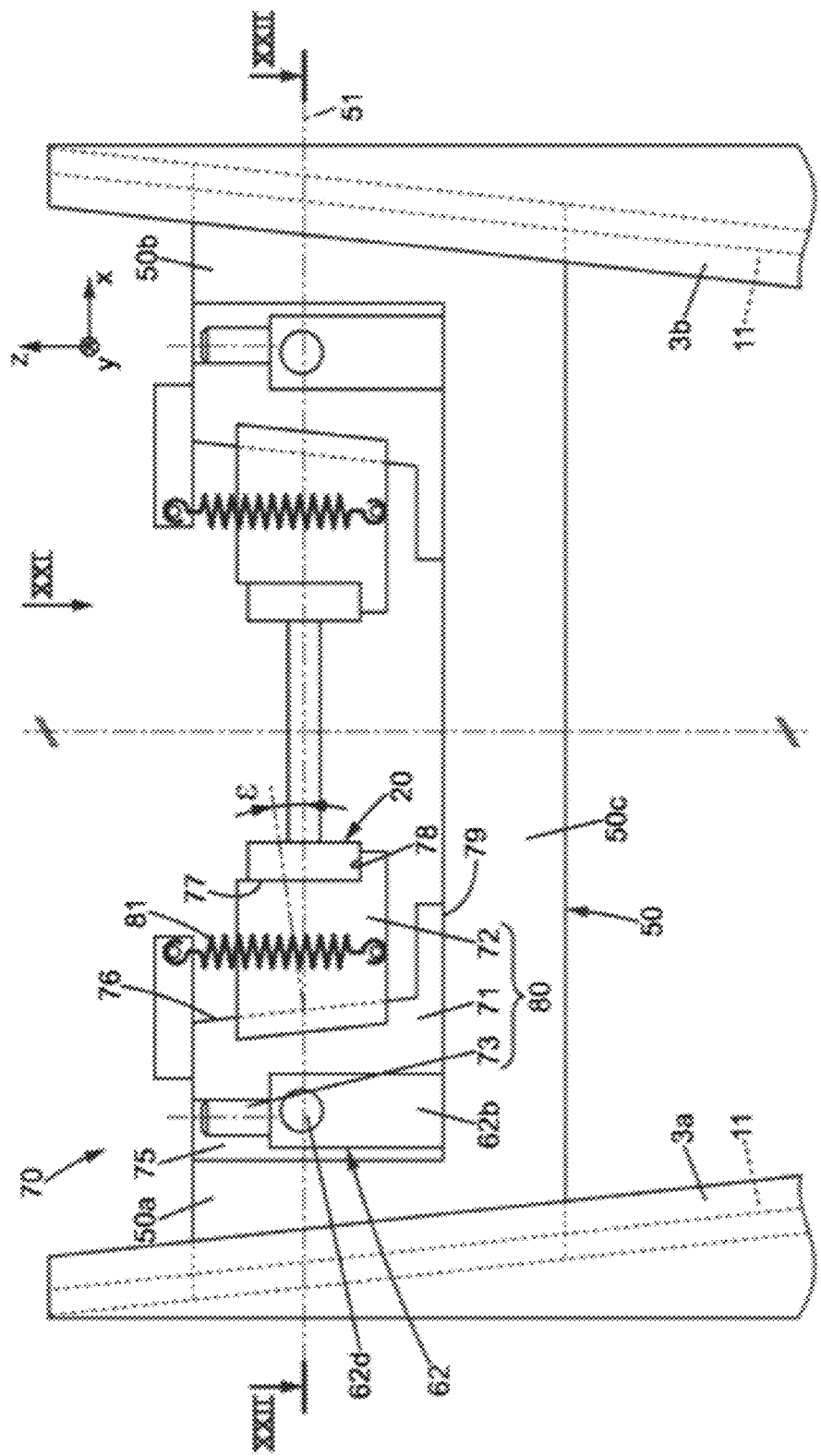
FIG. 20 is an end view of a second embodiment of self-locking means for the second family of embodiments of the invention.
Figure 21:
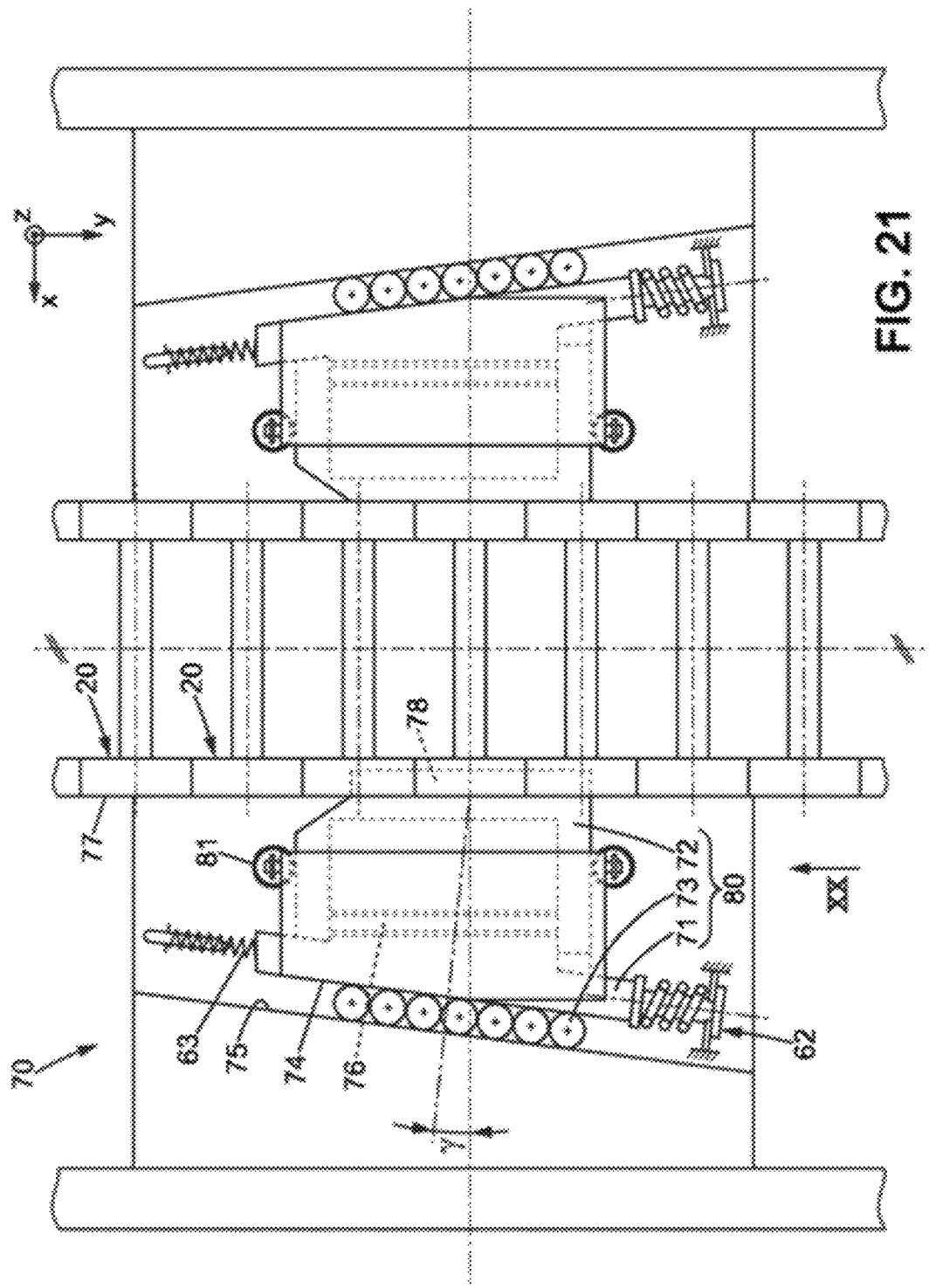
FIGS. 21 and 22 are, respectively, a top view along arrow XXI of FIG. 20 and a cutaway along plane XXII-XXII of FIG. 20.
Figure 22:
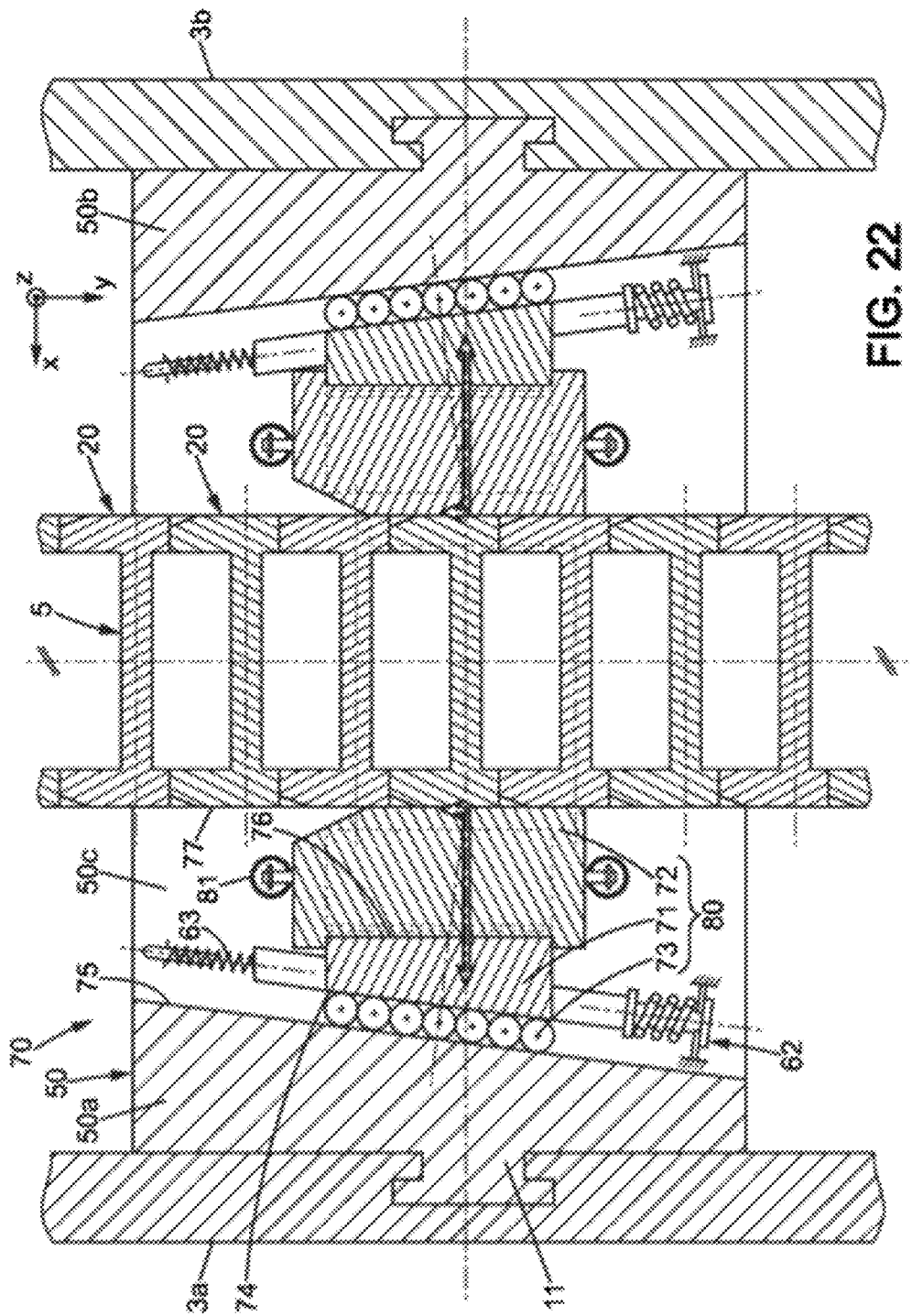

Using FIGS. 20 to 22, we will describe self-locking means 70 for the second family of embodiments of the invention. Self-locking means 70 comprises longitudinal carriage 71, gripping wedge 72 on board longitudinal carriage 71, and principal rollers 73 positioned between sliding surface 74 of longitudinal chariot 71 and a mutual locking support surface 75 belonging to support 50. Mutual locking support surface has a normal included in the plane (x, y) and is inclined to the "x" axis of jamming angle γ. This mutual locking support surface 75 plays the same role as the first surface of self-locking means 52.

Gripping wedge 72 is mutually supported on longitudinal carriage 71 by disengagement surface 76, whose normal is included in the plane (x, z) and inclined to the longitudinal "x" axis of an angle ϵ. Link portion 20 comprises gripping plane 77, perpendicular to axis 1a, and actuating surface 78, appreciably parallel to tangent plane 51. Gripping plane 77 receives only the pinching force parallel to the tangent plane along reference direction R, illustrated in FIG. 19.

Additionally, longitudinal carriage 71 has a radial support surface, 79, with portion 50c of support 50. The radial component exerted by link portion 20 on rotary element 1, 2 is transmitted to support 50 via actuating surface 78, disengagement surface 76, and mutual radial support surface 79.

Principal rollers 73, longitudinal carriage 71, and gripping wedge 72 are connecting solids in static equilibrium with one another in the locking configuration and together constitute connecting element 80, which connecting element 80 connects link portion 20 to support 50. This connecting element 80 is also a locking element, 80, which is jammed between mutual locking support surface 75 and gripping plane 77. Disengagement surfaces 76 are a mutual support interface inside connecting and locking element 80.

Advantageously, gripping wedge 72 is returned to a rest position by returning springs 81. Thus, gripping wedge 72 at rest keeps an axial clearance with respect to the approach trajectory of link portion 20.

Self-locking means 70 is equipped with movable stop 62 and return spring 63, playing the same role as in self-locking means 52.

Figure 23:
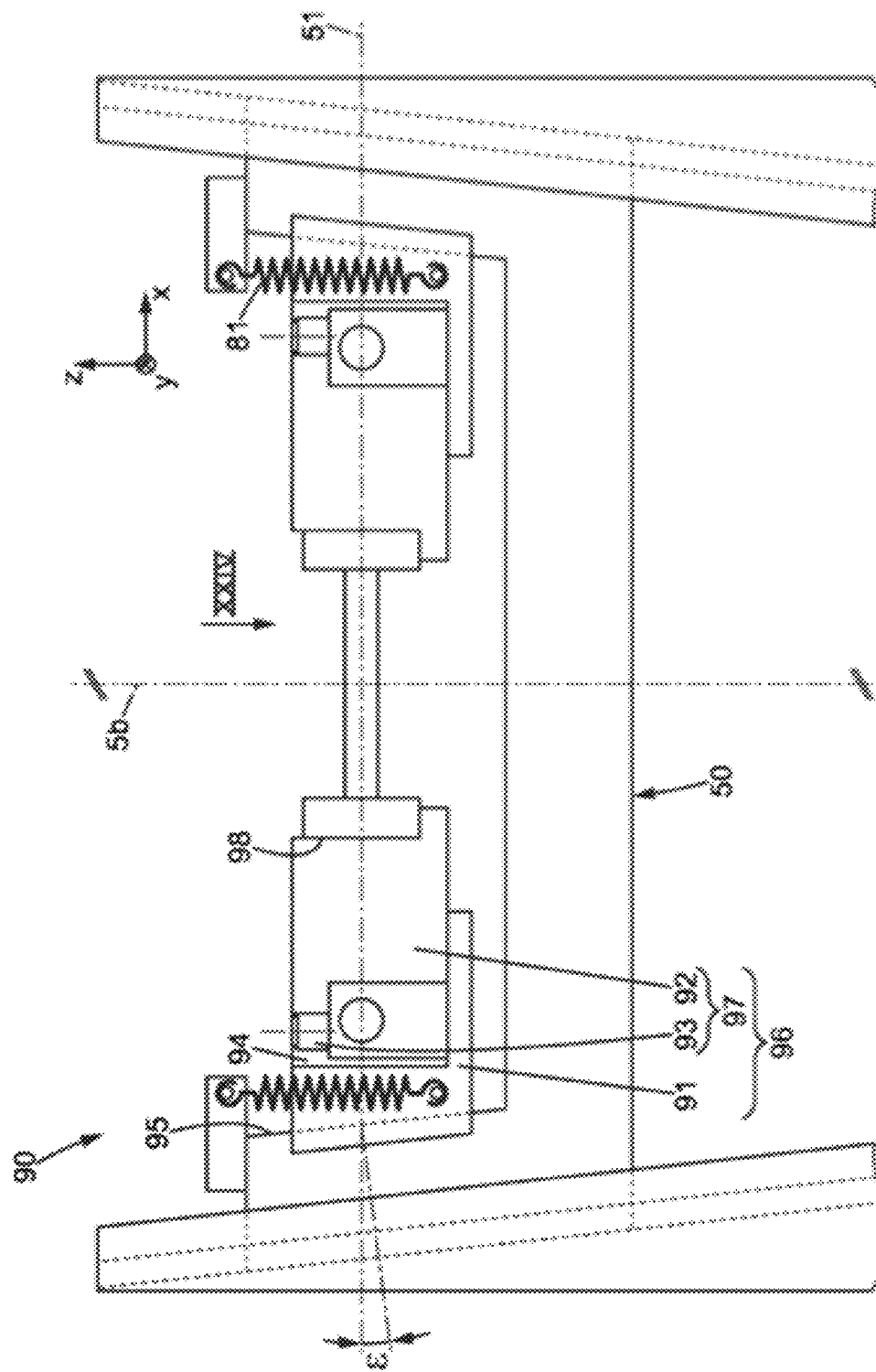
FIG. 23 is an end view of a third embodiment of self-locking means for said second family.
Figure 24:
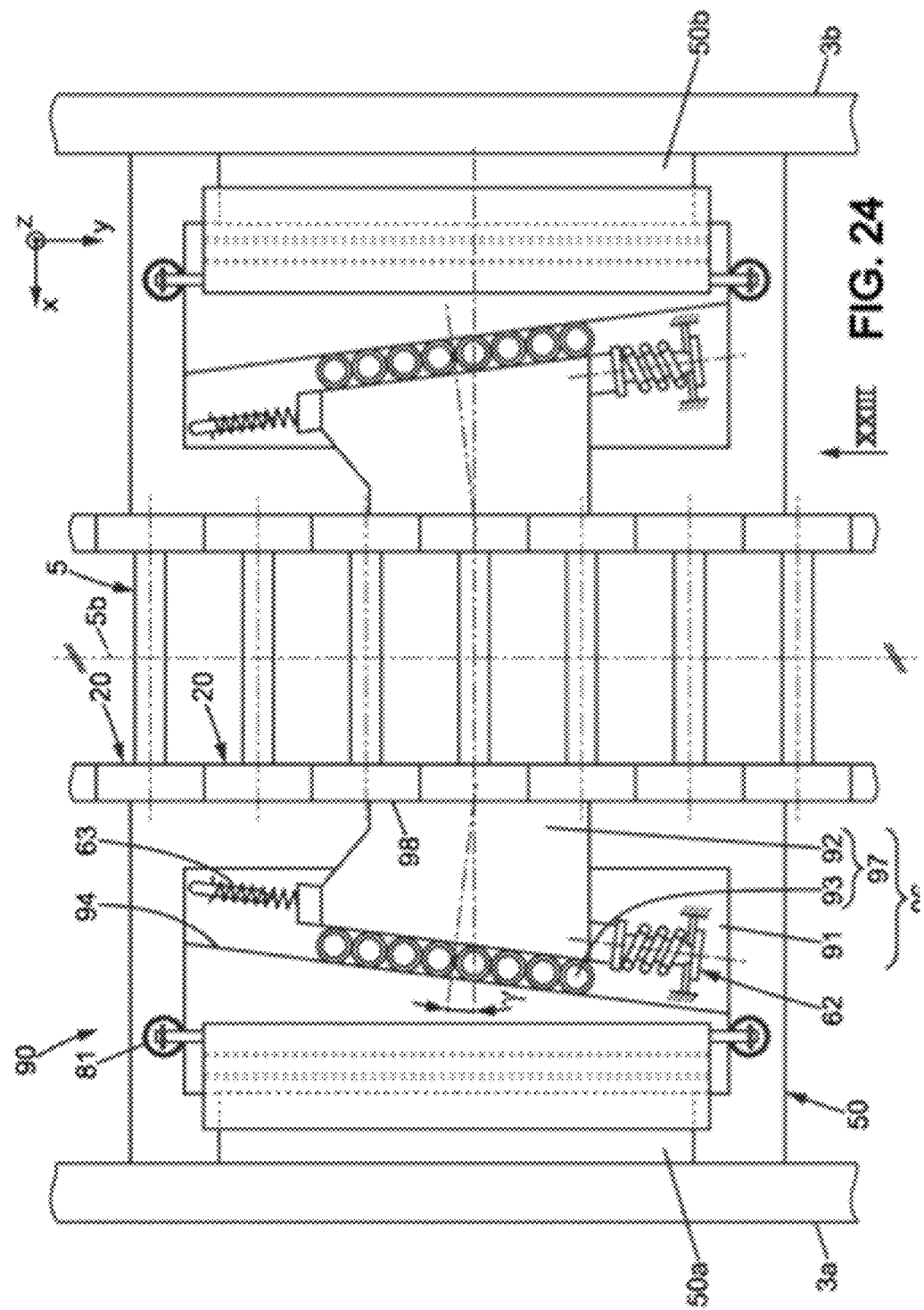
FIG. 24 is a top view along arrow XXIV of FIG. 23.

By means of FIGS. 23 and 24, we will describe self-locking means 90, which comprises a radial carriage, 91, and gripping wedge 92, on board radial carriage 90. Principal rollers 93 are placed between gripping wedge 92 and mutual locking support surface 94, which belongs to radial carriage 91. Mutual locking support surface 94 has a normal included in the plane (x, y) and is inclined to the longitudinal "x" axis of jamming angle γ. Radial carriage 91 and support 50 mutually support one another via mutual support surface 95, which is also disengagement surface 95, which is inclined at an angle ϵ to longitudinal axis "x." Self-locking means 90 comprises connecting element 96, consisting of connecting solids; these are radial carriage 91, gripping wedge 92, and principal rollers 93. Self-locking means 90 also comprises locking element 97, which differs from connecting element 96 and consists of only a part of connecting solids 91, 92, 93, which are gripping wedge 92 and principal rollers 93. Locking element 97 is designed to be jammed against mutual locking support surface 94 and gripping plane 98 of link portion 20.

The operation of self-locking means 70 and 90 is similar to that of self-locking means 52. The only change is the placement of the disengagement surface, which can be located on any interface between two connecting solids stacked to constitute the connecting element.

In a variant, not shown, the connecting solids can be connected permanently by a bridge of material to another connecting solid or to the support or to the link. This bridge of material constitutes the corresponding mutual support surface in the sense that it is rigid in the direction of the connecting force and can be deformable in a transverse direction. Thus, a variant analogous to FIG. 15d can comprise cam 46 articulated with respect to the support by means of a bridge of material. This variant can be part of the second family of embodiments of the invention by having, for example, an axis of flexibility of cam 46 parallel to the gripping plane and inclined at an angle ϵ to the longitudinal direction. The curved surface of the cam and the gripping plane thereby constitute disengagement surfaces while remaining a mutual locking support surface.

In a variant, the action of the connecting element between an upright of the support and the link portion, as well as the counter-reaction of the upright opposite the support on the same link portion can be supported by a more complex mechanism than a one-piece U support.

The invention claimed is:

1. A rotary power transmission mechanism comprising:
a link extending along a closed loop and consisting of a succession of portions, each of which has a longitudinal direction tangent to the closed loop;
a first and second rotary element, mobile in rotation respectively around a first and second axis;
link guide means designed to guide the link along a first drive circle coaxial to the first axis and along a second drive circle coaxial to the second axis, the closed loop comprising an active portion of each of the drive circles; and
means for temporarily unifying each link portion to successively each of the rotating elements whenever the link portion passes into the corresponding active portion;
wherein the temporary unification means comprise a plurality of self-locking means distributed at least along the active portion of the first drive circle, the self-locking means comprising at least a locking element simultaneously resting upon, on the one hand, a first support surface belonging to the first rotating element, and, on the other hand, upon a second support surface belonging to a link portion facing the locking element, wherein the first and second support surfaces are arranged in such a way that at least one locking element of the active portion of the first drive circle is jammed between the first and second support surface and is able to self-unlock whenever the corresponding self-locking means leaves the active portion, and wherein at least one of said first or second support surfaces is a tangential gripping surface that is parallel to the longitudinal direction of the link portion against which the locking element rests.

2. The mechanism according to claim 1, wherein the mechanism is of the type of continuously variable transmission (CVT) ratio mechanisms in which the guide means of the link are designed in such a way that the diameter of at least the first drive circle is continuously variable.

3. The mechanism according to claim 1 in which the locking elements are capable of rolling on the first and/or second corresponding support surfaces.

4. The mechanism according to claim 1 in which the locking elements of the mechanism are chosen from among a group consisting of: balls, rollers, barrels, subassemblies equipped with a support pad on one side and rolling elements on an opposite side, cams articulated at one extremity and having a curved and rubbing support surface at the other extremity, elongated cams having two curved and rubbing support extremities.

5. The mechanism according to claim 1 in which the plurality of self-locking means is distributed along the first drive circle or along the two drive circles.

6. The mechanism according to claim 5, in which the link has a first gripping plane perpendicular to the first and second axis in which each link portion comprises at least one rigid element, wherein each of the rigid elements comprises a first gripping surface extending into the first gripping plane.

7. The mechanism according to claim 5, in which the first rotary element, or each of the two rotary elements, is equipped with a plurality of supports, radially mobile along the corresponding rotating element, wherein each of the self-locking means of the corresponding rotary element comprises at least one rigid locking element integral with the support and one return means designed to bring the locking element into a locking position.

8. The mechanism according to claim 7, in which the link has a first gripping plane perpendicular to the first and second axis in which each link portion comprises at least one rigid element, wherein each of the rigid elements comprises a first gripping surface extending into the first gripping plane, and in which each of the supports comprises said first support surface of the locking element integral with the support, wherein the same locking element, in locking position presses upon said second support surface in a zone having as its center a point known as the gripping point.

9. The mechanism according to claim 8, in which the first support surface is an appreciably plane locking surface having a locking angle (36, Y) with respect to the first gripping plane.

10. The mechanism according to claim 1, in which the normal to the locking surface has a supplementary angle ($\beta$) with respect to a plane perpendicular to a radius that passes through the gripping point.

11. The mechanism according to claim 1 further comprising a plurality of supports rotationally integral with the first rotating element and arranged along the first drive circle, in which each self-locking means has a tangent plane defined as being parallel to the first axis and tangent to the closed loop at the location of the self-locking means and comprises at least one connecting element consisting of a connecting solid or several connecting solids resting, two-by-two, on a mutual support surface,
in which when the self-locking means is in a locking configuration, the connecting element is resting on one of the supports through a mutual support surface and on a portion of the link through another mutual support surface,
in which at least one of the mutual support surfaces is a disengagement surface whose normal presents, with respect to the tangent plane, an angle ($\epsilon$) greater than or equal to a disengagement angle,
and in which each connecting element comprises said locking element consisting of all or part of the connecting solids, the locking element being, in its locking configuration, jammed between two mutual locking support surfaces situated on either side of the locking element.

12. The mechanism according to claim 11 in which the mutual support surfaces together define a reference direction (R), which is the direction of a force that would be transmitted to the support if the link portion exerted on the connecting element a force without radial component, and in which the disengagement angle is defined as being the smallest angle of inclination ($\epsilon$) of the normal to the disengagement surface with respect to the tangent plane, angle of inclination for which the reference direction is outside the cone of friction on the disengagement surface.

13. The mechanism according to claim 11 in which the disengagement angle is defined as having a tangent equal to the coefficient of friction ($\mu$) on the disengagement surface.

14. The mechanism according to claim 11 in which the support presents an overall U shape receiving the corresponding link portion arriving in the active portion, and in which the link portion is pinched between a force (F) exerted by the connecting element of the self-locking means between a branch of the U and the link portion and a counterreaction having an opposing axial component exerted between the other branch of the U and the same link portion.

15. The mechanism according to claim 11 in which the link portion comprises an actuating surface through which the link portion exerts, whenever it approaches the corresponding support, an actuating force having a radial component, which actuating force is then transmitted to the support via the connecting element, and in which the angle ($\epsilon$) of the disengagement surface is less than a predetermined maximum angle so that the appearance of the actuating force gives to the force (F) exerted by the connecting element between the support and the link portion a direction included in the cone of friction of the disengagement surface.

16. The mechanism according to claim 11 in which at least one of the mutual locking support surfaces that is not a disengagement surface has a normal parallel to the tangent plane and in which the connecting element is integral with the support.

17. The mechanism according to claim 16, in which the mutual locking support surface whose normal is parallel to the tangent plane belongs to the support and in which the connecting element is indistinguishable with the locking element and comprises a gripping wedge that cooperates with a gripping plane of the link that is also the disengagement surface.

18. The mechanism according to claim 16, in which the connecting element is indistinguishable with the locking element and comprises a longitudinal carriage movable in parallel to the tangent plane, the connecting and locking element also comprising a gripping wedge, located on the longitudinal carriage and sliding radially on the longitudinal carriage along the disengagement surface.

19. The mechanism according to claim 18 in which the connecting and locking element also comprises a series of parallel rollers placed between a sliding surface of the longitudinal carriage and the mutual locking support surface belonging to the support.

20. The mechanism according to claim 1, in which the locking elements are rigid.

21. A method of rotational power transmission between two rotating elements utilizing a link in a closed loop, the method comprising the steps:
of linking, in which each link portion circulates from one rotary element to another,
of the self-locking of link portions whenever these are around one of the rotating elements, and
of the self-unlocking of link portions whenever these circulate from one rotating element to the other,
wherein the self-locking occurs by jamming a locking element between the rotating element and said portion, the transmission of mechanical power occurring through friction upon a surface parallel to the tangent to the corresponding portion of the closed loop.

* * * * *